(12) United States Patent
Masuda

(10) Patent No.: US 9,197,880 B2
(45) Date of Patent: Nov. 24, 2015

(54) METHOD AND APPARATUS FOR THREE-DIMENSIONAL MEASUREMENT AND IMAGE PROCESSING DEVICE

(71) Applicant: FUJIFILM Corporation, Tokyo (JP)

(72) Inventor: Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/579,252

(22) Filed: Dec. 22, 2014

(65) Prior Publication Data

US 2015/0109420 A1    Apr. 23, 2015

Related U.S. Application Data

(63) Continuation of application No. PCT/JP2013/066855, filed on Jun. 19, 2013.

(30) Foreign Application Priority Data

Jun. 29, 2012  (JP) ................. 2012-146468

(51) Int. Cl.
| | |
|---|---|
| *H04N 13/02* | (2006.01) |
| *G01B 11/245* | (2006.01) |
| *G06T 7/00* | (2006.01) |
| *G01C 11/06* | (2006.01) |

(52) U.S. Cl.
CPC .......... *H04N 13/0239* (2013.01); *G01B 11/245* (2013.01); *G06T 7/0075* (2013.01); *G01C 11/06* (2013.01); *G06T 2207/10012* (2013.01)

(58) Field of Classification Search
CPC   G06F 11/245; H04N 13/0239; G06T 7/0075; G06T 2207/10012; G01C 11/06
See application file for complete search history.

(56) References Cited

U.S. PATENT DOCUMENTS

2011/0249117 A1 * 10/2011 Yoshihama et al. .. G06T 7/0075
348/135

FOREIGN PATENT DOCUMENTS

| JP | 2005-241323 A | 9/2005 |
|---|---|---|
| JP | 2007-263669 A | 10/2007 |
| JP | 2011-232330 A | 11/2011 |

OTHER PUBLICATIONS

Translation of the International Preliminary Report on Patentability and Written Opinion of the International Searching Authority (Forms PCT/IB/338, PCT/IB/373 and PCT/ISA/237), dated Jan. 8, 2015, for International Application No. PCT/JP2013/066855.
International Search Report, issued in PCT/JP2013/066855, dated Jul. 30, 2013.
Written Opinion of the International Searching Authority, issued in PCT/JP2013/066855, dated Jul. 30, 2013.

* cited by examiner

*Primary Examiner* — Behrooz Senfi
*Assistant Examiner* — Maria Vazquez Colon
(74) *Attorney, Agent, or Firm* — Birch, Stewart, Kolasch & Birch, LLP

(57) ABSTRACT

Three-dimensional measurement apparatus comprises first and second imaging units with baseline length, feature point detector for detecting feature points in image, corresponding point detector for detecting corresponding points corresponding to the feature points, rotation matrix calculator, translation matrix calculator, distance calculator, and data calculator. Based on the feature points and the corresponding points, the rotation matrix calculator calculates a rotation matrix representing direction and amount of rotation of a second image capture position relative to a first image capture position and the translation matrix calculator calculates a translation matrix representing a translation direction of the second image capture position relative to the first image capture position. Based on the rotation matrix, the translation matrix, and the baseline length, the distance calculator calculates a translation distance to the second image capture position relative to the first image capture position. The data calculator calculates three-dimensional data based on the translation distance.

13 Claims, 17 Drawing Sheets

METHOD AND APPARATUS FOR THREE-DIMENSIONAL MEASUREMENT AND IMAGE PROCESSING DEVICE

CROSS-REFERENCE TO RELATED APPLICATIONS

This application is a Continuation of PCT International Application No. PCT/JP2013/066855 filed on Jun. 19, 2013, which claims priority under 35 U.S.C. §119(a) to Japanese Patent Application No. 2012-146468, filed Jun. 29, 2012. Each of the above application(s) is hereby expressly incorporated by reference, in its entirety, into the present application.

BACKGROUND OF THE INVENTION

1. Field of the Invention

The present invention relates to a method and an apparatus for three-dimensional measurement and an image processing device, for calculating three-dimensional data of an object from taken images.

2. Description Related to the Prior Art

A three-dimensional measurement apparatus that calculates three-dimensional data (for example, dimensions) of an object based on two images of an object taken from two different image capture positions is known. The three-dimensional measurement apparatus is composed of, for example, two cameras, a processing device, and the like. The two cameras are disposed with a predetermined space (hereinafter referred to as the baseline length) from each other in a left-right direction. The processing device calculates the three-dimensional data based on the images with parallax, taken with the two cameras.

For the three-dimensional measurement, the two images need to have parallax and contain the same object. For example, images taken with a stereo camera having two taking lenses may be used. Accuracy in measuring the three-dimensional data with the three-dimensional measurement apparatus depends on a relationship between the scale of the object and the baseline length. In a case where the scale of the object is large relative to the baseline length of the stereo camera, the obtained three-dimensional data may be unreliable due to a large error. For this reason, a long baseline length is necessary for measuring the three-dimensional data of an object with the relatively large scale (e.g. a building) with high accuracy. For example, a three-dimensional measurement apparatus disclosed in Japanese Patent Laid-Open Publication No. 2007-263669 constitutes a huge stereo camera as a whole with the use of two cameras mounted on a car.

It is necessary to measure or specify the baseline length accurately to perform the three-dimensional measurement with high accuracy. Normally, the stereo camera is precisely calibrated in advance at the time of manufacture, to achieve the predetermined baseline length. However, it is difficult to measure the baseline length accurately or to adjust the baseline length accurately to the predetermined value in the case where the two cameras are used to constitute the huge stereo camera as described in the Japanese Patent Laid-Open Publication No. 2007-263669. For this reason, the Japanese Patent Laid-Open Publication Nos. 2007-263669 and 2005-241323 disclose calibration methods for accurately measuring the baseline length in advance.

Recently, a three-dimensional measurement apparatus which measures the three-dimensional data with high accuracy with a stereo camera having a short baseline length has been known. The three-dimensional data is measured based on the images of the object taken from two image capture positions. However, a three-dimensional measurement apparatus disclosed in U.S. Patent Application Publication No. 2011/0249117 (corresponding to Japanese Patent Laid-Open Publication No. 2011-232330) needs to take an image of a reference object having known shape and dimensions together with the object whose three-dimensional data is to be measured, to obtain the distance between the two image capture positions. Suppose the stereo camera at the first image capture position and the stereo camera at the second image capture position constitute a huge stereo camera as a whole, the distance between the two image capture positions corresponds to the baseline length of the huge stereo camera. This three-dimensional measurement apparatus is similar to those disclosed in the Japanese Patent Laid-Open Publication Nos. 2007-263669 and 2005-241323 in that the baseline length needs to be a known value.

In the case where the two cameras are used to constitute the huge stereo camera having a long baseline length (distance between the two cameras) to perform the three-dimensional measurement, the baseline length needs to be measured or calibrated with high accuracy in advance as disclosed in the Japanese Patent Laid-Open Publication Nos. 2007-263669 and 2005-241323. If the positions of the cameras are moved to place the object properly in the imaging fields, complicated recalibration is necessary. For example, in a case where the two cameras are mounted on a car as disclosed in the Japanese Patent Laid-Open Publication No. 2007-263669, the direction of the car needs to be changed to image the object properly with the two cameras. In addition, the positions of the cameras need to be changed in case of a narrow road or no-entry street.

Carrying the huge stereo camera with the long baseline length without it being mounted on the car is not practical because the stereo camera is too huge. In the case where the two cameras are carried separately, it is nearly impossible to rearrange them at the distance of the predetermined baseline length from each other without calibration. Thus, the huge stereo camera with the long baseline length is inconvenient because re-calibration is required in many circumstances.

In the case where the normal-sized stereo camera with the short baseline length is used to perform the three-dimensional measurement, it is possible to carry the reference object and place the reference object at an appropriate position to take an image of the object as described in the U.S. Patent Application Publication No. 2011/0249117, but it is inconvenient. For example, the reference object needs to be placed not to interfere with the three-dimensional measurement of the object. The three-dimensional measurement may not be performed in a case where the reference object cannot be placed properly with the object in the imaging field, for example, when the dimensions of the object situated at an elevated position are necessary. In addition, it is difficult to select the shape and the material of the reference object which enables the calculation of the baseline length of the huge stereo camera with high accuracy irrespective of the imaging circumstances.

Thus, the conventional apparatus requires the calibration that makes the operations complicated. The three-dimensional measurement cannot be performed with high accuracy without the calibration and the accurate measurement of the baseline length.

SUMMARY OF THE INVENTION

An object of the present invention is to provide a method and an apparatus for three-dimensional measurement and an image processing device, capable of easy and highly accurate three-dimensional measurement.

The three-dimensional measurement apparatus according to the present invention comprises a first imaging unit for imaging an object, a second imaging unit, a feature point detector, a corresponding point detector, a rotation matrix calculator, a translation matrix calculator, a translation distance calculator, and a three-dimensional data calculator. The second imaging unit is disposed at a distance of a predetermined baseline length from the first imaging unit. The second imaging unit images at least a part of the object imaged with the first imaging unit. The feature point detector detects a plurality of feature points in at least one of two images of the object taken from a first image capture position with the first and second imaging units. The corresponding point detector detects corresponding points in each of the two images of the object taken from a second image capture position with the first and second imaging units. The second image capture position is different from the first image capture position. The corresponding points correspond to the feature points. The rotation matrix calculator calculates a first rotation matrix and a second rotation matrix based on the feature points and the corresponding points. The first rotation matrix represents direction and amount of rotation of the first imaging unit at the second image capture position relative to a direction of the first imaging unit or the second imaging unit at the first image capture position. The second rotation matrix represents direction and amount of rotation of the second imaging unit at the second image capture position relative to the direction of the first imaging unit or the second imaging unit at the first image capture position. The translation matrix calculator calculates a first translation matrix and a second translation matrix based on the feature points and corresponding points. The first translation matrix represents a translation direction of the first imaging unit at the second image capture position relative to a position of the first imaging unit or the second imaging unit at the first image capture position. The second translation matrix represents a translation direction of the second imaging unit at the second image capture position relative to the position of the first imaging unit or the second imaging unit at the first image capture position. The translation distance calculator calculates a translation distance of the first imaging unit or the second imaging unit at the second image capture position relative to the first imaging unit or the second imaging unit at the first image capture position. The translation distance calculator calculates the translation distance based on the first rotation matrix, the second rotation matrix, the first translation matrix, the second translation matrix, and the baseline length in a case where at least one of the first rotation matrix and the second rotation matrix is not a zero matrix. The three-dimensional data calculator calculates three-dimensional data of the object based on the translation distance.

It is preferred that the translation distance calculator calculates a position of a baseline length vector at which a distance between a terminal point of the baseline length vector and one of a first direction and a second direction is at a minimum value, and calculates the each translation distance based on a position of an initial point and a position of the terminal point of the baseline length vector located at the calculated position. The baseline length vector has the baseline length. The initial point of the baseline length vector defined by the first rotation matrix and the second rotation matrix is placed on the other of the first direction and the second direction. The first direction is represented by the first translation matrix, and the second direction is represented by the second translation matrix.

It is preferred that the translation distance calculator compares the minimum value of the distance between the terminal point of the baseline length vector and the one of the first direction and the second direction with a predetermined threshold value and recalculates the translation distance with a changed condition in a case where the minimum value is greater than or equal to the predetermined threshold value.

It is preferred that the translation distance calculator recalculates the translation distance with the changed condition in a case where a difference between a first translation distance and a second translation distance is greater than or equal to a predetermined threshold value. The first translation distance is calculated based on a combination of the images selected arbitrarily from the four images taken from the first image capture position and the second image capture position. The second translation distance is calculated based on a combination of the images different from the combination of the images used for calculating the first translation distance. The first translation distance and the second translation distance correspond to the same distance between the imaging units.

It is preferred that, in a case where the translation distance calculator recalculates the translation distance, the corresponding point detector changes a condition for detecting the corresponding points and redetects the corresponding points. The rotation matrix calculator, the translation matrix calculator, and the translation distance calculator recalculate the rotation matrix, the translation matrix, and the translation distance, respectively, based on the feature points and the redetected corresponding points.

The condition changed for redetecting the corresponding points may be a combination of the feature points.

It is preferred that the corresponding point detector detects the corresponding points with the use of a block matching method in which a partial image of the image taken from the first image capture position is compared with each portion of the image taken from the second image capture position and the portion with high coincidence with the partial image is determined to be the corresponding point. The partial image contains one of the feature points in the image taken from the first image capture position. The condition changed for redetecting the corresponding points includes one of a scaling factor and a rotation angle of the partial image used for the comparison between the partial image and the portion of the image taken from the second image capture position.

It is preferred that the feature point detector changes a condition for detecting the feature points and redetects the feature points. It is preferred that the corresponding point detector redetects the corresponding points based on the redetected feature points. It is preferred that the rotation matrix calculator, the translation matrix calculator, and the translation distance calculator recalculate the rotation matrix, the translation matrix, and the translation distance, respectively, based on the redetected feature points.

It is preferred that the rotation matrix calculator recalculates the second rotation matrix based on an assumed value, being the translation distance of the first imaging unit, the first rotation matrix, and the first translation matrix. It is preferred that the translation matrix calculator recalculates the second translation matrix based on the assumed value, the first rotation matrix, and the first translation matrix. The translation distance calculator calculates an epipolar line determined by the feature point, for at least one feature point, on the image taken from the second image capture position, based on the assumed value, a recalculated second rotation matrix, and a recalculated second translation matrix. The translation distance calculator calculates coincidence with the feature point along the epipolar line. The translation distance calculator changes the assumed value and repeats the calculation of the coincidence and selects the epipolar line with the highest coincidence and thereby determines the second image capture position and recalculates the translation distance.

It is preferred that the translation distance calculator calculates in advance the translation distances with different conditions which differ in a combination of the feature points, out of the plurality of feature points, used for detecting the corresponding points or a condition for detecting the corresponding points, and the three-dimensional data calculator compares the minimum values of the distances between the one of the first and second directions and the terminal point of the baseline length vector, and uses the translation distance calculated with the condition in which the smaller minimum value is obtained.

It is preferred that the three-dimensional data refers to a dimension of the object in real space or three-dimensional model data of the object.

The image processing device according to the present invention comprises a storage, a feature point detector, a corresponding point detector, a rotation matrix calculator, a translation matrix calculator, a translation distance calculator, and a three-dimensional data calculator. The storage stores images of an object taken from first and second image capture positions with one or two stereo cameras. The stereo camera comprises a first imaging unit for imaging the object and a second imaging unit disposed at a distance of a predetermined baseline length from the first imaging unit. The second imaging unit images at least a part of the object imaged with the first imaging unit. The feature point detector detects a plurality of feature points in at least one of the two images of the object taken from the first image capture position with the first and second imaging units. The corresponding point detector detects corresponding points in each of the two images of the object taken from the second image capture position with the first and second imaging units. The second image capture position is different from the first image capture position. The corresponding points correspond to the feature points. The rotation matrix calculator calculates a first rotation matrix and a second rotation matrix based on the feature points and the corresponding points. The first rotation matrix represents direction and amount of rotation of the first imaging unit at the second image capture position relative to a direction of the first imaging unit or the second imaging unit at the first image capture position. The second rotation matrix represents direction and amount of rotation of the second imaging unit at the second image capture position relative to the direction of the first imaging unit or the second imaging unit at the first image capture position. The translation matrix calculator calculates a first translation matrix and a second translation matrix based on the feature points and corresponding points. The first translation matrix represents a translation direction of the first imaging unit at the second image capture position relative to a position of the first imaging unit or the second imaging unit at the first image capture position. The second translation matrix represents a translation direction of the second imaging unit at the second image capture position relative to the position of the first imaging unit or the second imaging unit at the first image capture position. The translation distance calculator calculates a translation distance of the first imaging unit or the second imaging unit at the second image capture position relative to the first imaging unit or the second imaging unit at the first image capture position. The translation distance calculator calculates the translation distance based on the first rotation matrix, the second rotation matrix, the first translation matrix, the second translation matrix, and the baseline length in a case where at least one of the first rotation matrix and the second rotation matrix is not a zero matrix. The three-dimensional data calculator calculates three-dimensional data of the object based on the translation distance.

The three-dimensional measurement method according to the present invention and comprises a feature point detection step, a corresponding point detection step, a rotation matrix calculation step, a translation matrix calculation step, a translation distance calculation step, and a three-dimensional data calculation step. In the feature point detection step, a plurality of feature points are detected in at least one of two images of the object taken from a first image capture position with the first and second imaging units. In the corresponding point detection step, a plurality of corresponding points that correspond to the feature points are detected in each of two images of the object taken from a second image capture position with the stereo camera. The second image capture position is different from the first image capture position. In the rotation matrix calculation step, a first rotation matrix and a second rotation matrix are calculated based on the feature points and the corresponding points. The first rotation matrix represents direction and amount of rotation of the first imaging unit at the second image capture position relative to a direction of the first imaging unit or the second imaging unit at the first image capture position. The second rotation matrix represents direction and amount of rotation of the second imaging unit at the second image capture position relative to the direction of the first imaging unit or the second imaging unit at the first image capture position. In the translation matrix calculation step, a first translation matrix and a second translation matrix are calculated based on the feature points and corresponding points. The first translation matrix represents a translation direction of the first imaging unit at the second image capture position relative to a position of the first imaging unit or the second imaging unit at the first image capture position. The second translation matrix represents a translation direction of the second imaging unit at the second image capture position relative to the position of the first imaging unit or the second imaging unit at the first image capture position. In the translation distance calculation step, a translation distance of the first imaging unit or the second imaging unit at the second image capture position is calculated relative to the first imaging unit or the second imaging unit at the first image capture position. The translation distance is calculated based on the first rotation matrix, the second rotation matrix, the first translation matrix, the second translation matrix, and the baseline length in a case where at least one of the first rotation matrix and the second rotation matrix is not a zero matrix. In the three-dimensional data calculation step, three-dimensional data of the object is calculated based on the translation distance. The three-dimensional measurement method is a method for measuring three-dimensional data of an object with one or two stereo cameras. The stereo camera comprises a first imaging unit for imaging the object and a second imaging unit disposed at a distance of a predetermined baseline length from the first imaging unit. The second imaging unit images at least a part of the object imaged with the first imaging unit.

According to the present invention, two imaging units with the predetermined baseline length are used to take the images from the two image capture positions. A distance (which corresponds to the baseline length of a huge stereo camera) between the imaging units is calculated based on the taken images. Thereby the three-dimensional measurement is performed with high accuracy without calibration or a reference object, but only with the use of the images of the object whose three-dimensional data is to be measured.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

First Embodiment

Figure 1:
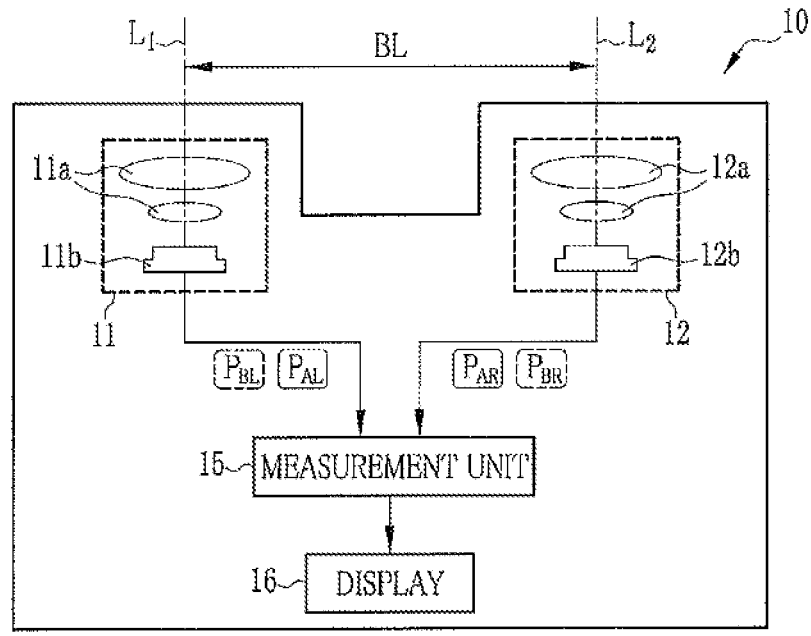
FIG. 1 is an explanatory view of a three-dimensional measurement apparatus.

As illustrated in FIG. 1, a three-dimensional measurement apparatus 10 comprises a first imaging unit 11, a second imaging unit 12, a measurement unit 15, and a display 16. In other words, the three-dimensional measurement apparatus 10 comprises the so-called stereo camera with the measurement unit 15, to calculate three-dimensional data of an object from taken images. The three-dimensional measurement apparatus 10 is compact in size (the order of the size of a simple conventional stereo camera) and carried easily.

The first imaging unit 11 and the second imaging unit 12 are disposed side by side in a left-right direction of the three-dimensional measurement apparatus 10. Imaging optical axes $L_1$ and $L_2$ are parallel. A baseline length BL is determined accurately at the manufacture of the three-dimensional measurement apparatus 10, and is a known value in the three-dimensional measurement using the images taken with the first and second imaging units 11 and 12. Note that the baseline length BL is a distance between the first imaging unit 11 and the second imaging unit 12, and more specifically, a distance between the imaging optical axes $L_1$ and $L_2$. In a case where the imaging optical axes $L_1$ and $L_2$ are not parallel, the baseline length BL is a distance between principal points of the imaging units 11 and 12, for example.

Imaging fields of the first imaging unit 11 and the second imaging unit 12 are at least partly overlapped with each other. The first imaging unit 11 and the second imaging unit 12 simultaneously capture images of the same object located in the overlapping imaging fields and output a pair of images with parallax in the left-right direction. Note that "the object" in this specification refers to an object or target whose three-dimensional data is to be measured. Hereinafter, the object whose three-dimensional data is to be calculated is contained in each of the images taken with the first imaging unit 11 and the second imaging unit 12. However, three-dimensional data of an object in only one of the images (that is, the image taken with the first imaging unit 11 or the second imaging unit 12) may be calculated based on a structure (a building or the like) located in the overlapping imaging fields.

The first imaging unit 11 comprises a taking lens 11a, an image sensor 11b, and the like. The taking lens 11a forms an image of the object on the image sensor 11b. The taking lens 11a comprises an aperture stop, a movable lens, and a cam, a gear, and the like to make the aperture stop and the movable lens work (all not shown). The taking lens 11a is capable of AF (autofocusing) and magnification or zooming. The image sensor 11b is, for example, a CMOS or a CCD and photoelectrically converts the image of the object, which is formed on the imaging surface by the taking lens 11a, on a pixel-by-pixel basis. Thereby the image sensor 11b outputs the image of the object to the measurement unit 15.

The second imaging unit 12 comprises a taking lens 12a, an image sensor 12b, and the like. The taking lens 12a is the same as the taking lens 11a of the first imaging unit 11, and the image sensor 12b is the same as the image sensor 11b of the first imaging unit 11, by way of example. However, the sections (or the parts) of the first imaging unit 11 may not necessarily be precisely the same as those of the second imaging unit 12, and may differ from each other. The second imaging unit 12 outputs the taken image to the measurement unit 15, as with the first imaging unit 11.

Note that the operations of the first imaging unit 11 and the second imaging unit 12 are controlled by a CPU (not shown) and the like in accordance with a predetermined program. The three-dimensional measurement apparatus 10 comprises an image processing circuit, a memory, an A/D conversion circuit, and the like (not shown). The images outputted from the first and second imaging units 11 and 12 are inputted to the measurement unit 15 after being subjected to various types of image processing such as A/D conversion, white balance correction, and gamma correction.

The measurement unit 15 calculates the three-dimensional data of the object based on four types of images taken from at least two different image capture positions with the first and second imaging units 11 and 12. The three-dimensional data calculated by the measurement unit 15 includes dimensions in real space such as a distance (length, height, or width) between two points, a length of a curve, curvature, area, volume, and positional coordinates, and three-dimensional model data, which represents the object with wire frames or a polygon, in virtual space. The measurement unit 15 calculates at least one of the above-described data as the three-dimensional data, in accordance with a given setting or condition. The measurement unit 15 allows displaying the calculated three-dimensional data on the display 16 in accordance with the setting. For example, the measurement unit 15 allows displaying the taken image on the display 16, with the dimensions or the like of the object in the real space superimposed thereon. The measurement unit 15 associates the taken image with the calculated three-dimensional data, and stores them in a recording device (not shown) such as a memory or a detachable media card. The calculated three-dimensional data is displayed on the display 16 as necessary. The three-dimensional data may not be displayed on the display 16 in a case where the calculated three-dimensional data is stored in a usable form in another device (a computer or the like).

To calculate the three-dimensional data, note that the measurement unit 15 needs images of the object taken from at least two different image capture positions. Hereinafter, the images of the object are taken from two image capture positions (first image capture position A and second image capture position B), and thereby four types of images $P_{AL}$, $P_{AR}$, $P_{BL}$, and $P_{BR}$ are obtained. A first subscript (A or B) next to the letter "P" of the images $P_{AL}$, $P_{AR}$, $P_{BL}$, or $P_{BR}$ denotes the image capture position. A second subscript (L or R) next to the first subscript denotes the imaging unit which took the image. The second subscript "L" denotes that the image is taken by the first imaging unit 11. The second subscript "R" denotes that the image is taken by the second imaging unit 12. For example, the image $P_{AL}$ is taken from the first image capture position A with the first imaging unit 11. The image $P_{AR}$ is taken from the first image capture position A with the second imaging unit 12. The image $P_{BL}$ is taken from the second image capture position B with the first imaging unit 11. The image $P_{BR}$ is taken from the second image capture position B with the second imaging unit 12. The measurement unit 15 uses at least three of the four types of images $P_{AL}$, $P_{AR}$, $P_{BL}$, and $P_{BR}$ to calculate the three-dimensional data of the object.

Figure 2:
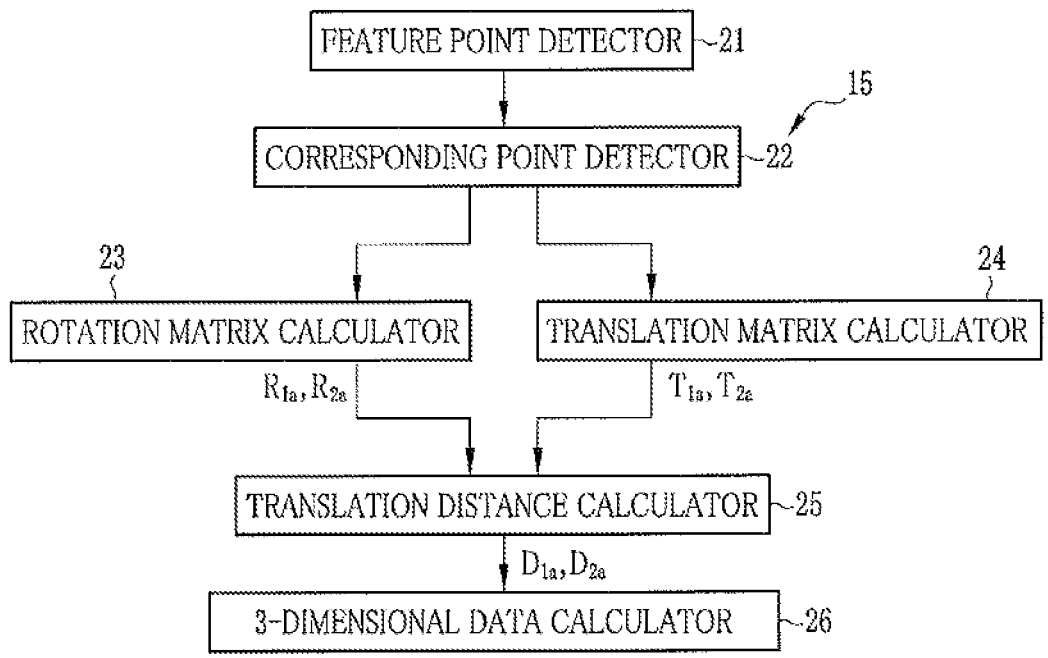
FIG. 2 is a block diagram of a measurement unit.

As illustrated in FIG. 2, the measurement unit 15 comprises a feature point detector 21, a corresponding point detector 22, a rotation matrix calculator 23, a translation matrix calculator 24, a translation distance calculator 25, and a three-dimensional data calculator 26.

The feature point detector 21 detects a plurality of feature points in the inputted image, and inputs information of the feature points such as coordinates of the feather points to the corresponding point detector 22, the rotation matrix calculator 23, and/or the translation matrix calculator 24. The feature point is, for example, a corner of the object, or an end point, an intersection, or a branch point of the lines of the object. The type of the feature point, which is detected by the feature point detector 21, is selected or determined arbitrarily. An algorithm used for a feature point detection process, which is performed by the feature point detector 21, is also determined arbitrarily. For example, Moravec algorithm or Harris algorithm may be used in a case where corners of the object are detected as the feature points.

Note that at least eight feature points are necessary for calculating the three-dimensional data. The type of the feature points is so selected as to detect at least eight feature points. In a case where the number of the detected feature points is less than eight, the feature point detector 21 changes the type of the feature points to be detected or the algorithm for detecting the feature points to ensure detecting at least eight feature points. In case the feature point detector 21 cannot detect eight feature points even after changing the type of the feature points or the algorithm for detection, the feature point detector 21 notifies a user of an error and prompts for changing the images to be used or taking image(s) of the object again.

Although the number of the detected feature points varies depending on the shape of the object or the like, the feature point detector 21 detects the plurality of feature points (more than eight feature points) in most cases. The feature point detector 21 then selects eight to over a dozen or so feature points from the plurality of feature points detected. The feature points selected by the feature point detector 21 may be of any number greater than or equal to eight in the case where the plurality of feature points are detected. Instead of using the selected feature points, all of the detected feature points may be used. In this case, however, it takes quite a long time to detect corresponding points, which will be described below. Therefore it is preferred to select the feature points with the number within a range in which the accuracy is ensured, for example, from eight to a little over a dozen as described above.

After receiving information of the feature points from the feature point detector 21, the corresponding point detector 22 detects the corresponding points, which correspond to the respective feature points, in the image different from the one in which the feature points are detected. An algorithm used for a corresponding point detection process, which is performed by the corresponding point detector 22, is selected or determined arbitrarily. For example, a block matching method or a KLT feature tracker may be used. In a case where the block matching method is used to detect the corresponding points, a partial image with a predetermined size and containing the feature point is cut out from the image in which the feature points are detected. While being scaled up (or down) or rotated, the partial image is compared with each portion of the image in which the corresponding point is to be detected, and the portion (or point) of the image with high coincidence (or similarity) with the partial image is detected as the corresponding point. The information of the corresponding point, such as the coordinates of the corresponding point detected by the corresponding point detector 22, is inputted to the rotation matrix calculator 23 and the translation matrix calculator 24.

The corresponding point detector 22 detects the corresponding points in two images for each three-dimensional measurement. For example, in a case where the feature point detector 21 detects the feature points in one of the images $P_{AL}$ and $P_{AR}$, the corresponding point detector 22 detects the corresponding points in the images $P_{BL}$ and $P_{BR}$. In this embodiment, an example which corresponds to the above pattern for detecting the corresponding points is described. Alternatively, in a case where the feature point detector 21 detects the feature points in each of the images $P_{AL}$ and $P_{AR}$, the corresponding points which correspond to the feature points of the image $P_{AL}$ may be detected in one of the images $P_{BL}$ and $P_{ER}$, and the corresponding points which correspond to the feature points of the image $P_{AR}$ may be detected in the other of the images $P_{BL}$ and $P_{BR}$. This will be described below in a third embodiment (see FIGS. 14 and 15). The pattern for detecting the corresponding points (that is, in which images the corresponding points are detected) is changed in accordance with the setting or condition.

The rotation matrix calculator 23 calculates a rotation matrix based on the image in which the feature points were detected, the information of the detected feature points, the image in which the corresponding points were detected, and the information of the detected corresponding points. The rotation matrix represents the direction and the amount of the rotation of the imaging unit which took the image in which the corresponding points were detected, relative to the position of the imaging unit which took the image in which the feature points were detected.

Figure 3:
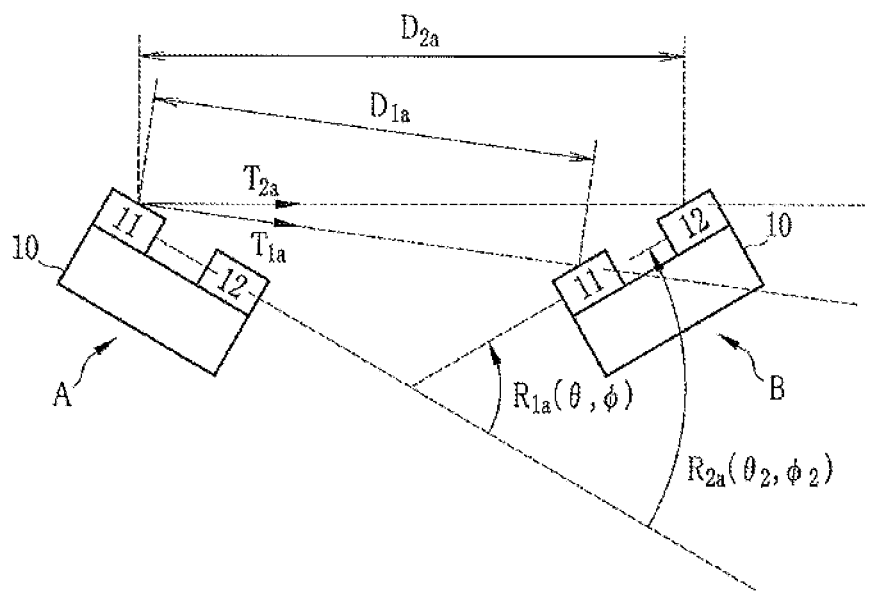
FIG. 3 is an explanatory view illustrating rotation matrices, translation matrices, and translation distances.

For example, as illustrated in FIG. 3, the rotation matrix calculator 23 calculates a rotation matrix $R_{1a}$ based on the feature points in the image $P_{AL}$ and the corresponding points in the image $P_{BL}$. The rotation matrix $R_{1a}$ represents the direction and the amount of the rotation of the first imaging unit 11 at the second image capture position B, relative to the first imaging unit 11 at the first image capture position A.

The rotation matrix $R_{1a}$ is represented by using two parameters, for example, a rotation angle $\theta$ in a horizontal plane and a rotation angle $\phi$ with respect to a vertical direction. In a case where X, Y, and Z axes, which are orthogonal to each other, are defined in the real space, the rotation matrix $R_{1a}$ may be represented by rotation angles $\alpha$, $\beta$, and $\gamma$ relative to the respective X, Y, and Z axes. The rotation matrix $R_{1a}$ represented by the rotation angles $\theta$ and $\phi$ is substantially the same as the rotation matrix $R_{1a}$ represented by the rotation angles $\alpha$, $\beta$, and $\gamma$.

The rotation matrix calculator 23 calculates a rotation matrix $R_{2a}$ based on the feature points in the image $P_{AL}$ and the corresponding points in the image $B_{PR}$ in a like manner similar. The rotation matrix $R_{2a}$ represents the direction and the amount of the rotation of the second imaging unit 12 at the second image capture position B, relative to the first imaging unit 11 at the first image capture position A. Note that FIG. 3 is illustrated two-dimensionally, so that the rotation matrices $R_{1a}$ and $R_{2a}$ may seem to represent the same rotation. However, the rotation matrix $R_{1a}$ differs from the rotation matrix $R_{2a}$ in a case where the three-dimensional measurement apparatus 10 is rotated in the horizontal and the vertical directions. In this case, the rotation matrix $R_{2a}$ is denoted by the rotation angles $\theta_2$ and $\phi_2$ which differ from those of the rotation matrix $R_{1a}$. Ina case where the three-dimensional measurement apparatus 10 is rotated only in the horizontal direction, the rotation matrix $R_{1a}$ is the same as the rotation matrix $R_{2a}$. The rotation matrices $R_{1a}$ and $R_{2a}$, which are calculated by the rotation matrix calculator 23, are inputted to the translation distance calculator 25.

Note that a specific method for calculating a rotation matrix based on the image in which the feature points were detected, the information of the detected feature points, the image in which the corresponding points were detected, and the information of the detected corresponding points is disclosed in Japanese Patent Laid-Open Publication No. 9-237341, for example.

The translation matrix calculator 24 calculates a translation matrix based on the image in which the feature points were detected, the information of the detected feature points, the image in which the corresponding points were detected, and the information of the detected corresponding points. The translation matrix represents the direction (translation direction) of the translation (displacement or change in position) of the imaging unit which took the image in which the corresponding points were detected, relative to the position of the imaging unit which took the image in which the feature points were detected.

To be more specific, the translation matrix calculator 24 calculates a translation matrix $T_{1a}$ (see FIG. 3) based on the feature points in the image $P_{AL}$ and the corresponding points in the image $P_{BL}$. The translation matrix $T_{1a}$ represents the translation direction (direction of the displacement or change in position) of the first imaging unit 11 at the second image capture position B relative to the first imaging unit 11 at the first image capture position A. However, only a normalized value of the translation matrix $T_{1a}$ is calculable in this example, so that information of a translation distance is not included.

The translation matrix calculator 24 calculates a translation matrix $T_{2a}$ based on the feature points in the image $P_{AL}$ and the corresponding points in the image $B_{PR}$ in a like manner. The translation matrix $T_{2a}$ represents the translation direction (direction of the displacement or change in position) of the second imaging unit 12 at the second image capture position B relative to the first imaging unit 11 at the first image capture position A. The translation matrix $T_{2a}$ represents a positional relationship between the first and second imaging units 11 and 12. In a strict sense, the translation matrix $T_{2a}$ does not represent the move (or motion) of the first and second imaging units 11 and 12. In this specification, the positional relationship (or change in position) between the imaging unit (the first imaging unit 11 or the second imaging unit 12) at the first image capture position A and the imaging unit (the first imaging unit 11 or the second imaging unit 12) at the second imaging unit B is referred to as "translation". A distance between the imaging units at the first and second image capture positions A and B is referred to as the translation distance. The translation matrix $T_{2a}$ is a normalized value and does not contain the information of the translation distance, as in the case of the translation matrix $T_{1a}$.

The translation matrices $T_{1a}$ and $T_{2a}$, which are calculated by the translation matrix calculator 24, are inputted to the translation distance calculator 25.

A specific method for calculating the translation matrix based on the image in which the feature points were detected, the information of the detected feature points, the image in which the corresponding points were detected, and the information of the detected corresponding points is disclosed in, for example, the Japanese Patent Laid-Open Publication No. 9-237341, as in the case of the method for calculating the rotation matrix. In this specification, the rotation matrix calculator 23 and the translation matrix calculator 24 are provided separately for the sake of explanation. Actually, the rotation matrix and the translation matrix are calculated as a pair substantially at the same time. The rotation matrix calculator 23 and the translation matrix calculator 24 constitute a circuit as a whole, which calculates the rotation matrix and the translation matrix.

Figure 4:
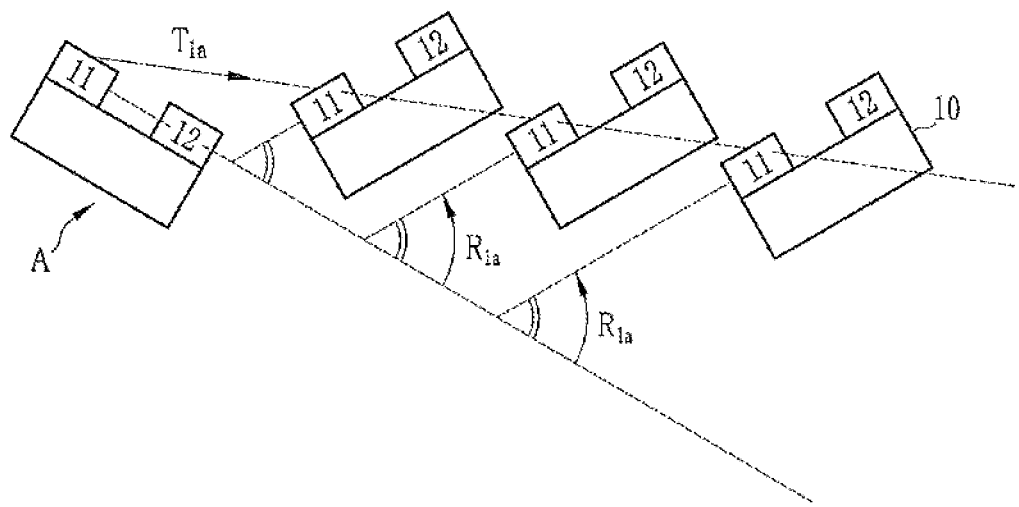
FIG. 4 is an explanatory view illustrating that the translation distance is determined arbitrarily.

As described above, the rotation matrix represents the direction and the amount of the rotation, while the translation matrix represents only the translation direction. The position of the imaging unit at the second image capture position B cannot be determined relative to the imaging unit at the first image capture position A only with the pair of the rotation matrix and the translation matrix ($R_{1a}$ and $T_{1a}$, or $R_{2a}$ and $T_{2a}$). To be more specific, as illustrated in FIG. 4, the translation matrix $T_{1a}$ determines the translation direction of the first imaging unit 11, and the rotation matrix $R_{1a}$ determines the direction and the amount (angle) of the rotation of the first imaging unit 11 relative to the translation direction. However, arbitrariness of the position of the second image capture position B still remains because the translation distance is not specified.

For this reason, the three-dimensional measurement apparatus 10 comprises the translation distance calculator 25, which calculates the translation distance between the imaging units at the first and second image capture positions A and B with the use of two pairs of the rotation matrices and the translation matrices. The translation distance calculator 25 calculates a translation distance $D_{1a}$ (see FIG. 3) to the first imaging unit 11 at the second image capture position B from the first imaging unit 11 at the first image capture position A with the use of the pair of the rotation matrix $R_{1a}$ and the translation matrix $T_{1a}$ and the pair of the rotation matrix $R_{2a}$ and the translation matrix $T_{2a}$. After the translation distance $D_{1a}$ is calculated, the arbitrariness of the position and the direction of the imaging unit at the second image capture position B relative to the imaging unit at the first image capture position A is eliminated by the translation distance $D_{1a}$, the rotation matrices $R_{1a}$ and $R_{2a}$, and the translation matrices $T_{1a}$ and $T_{2a}$. Thus, the translation distance $D_{2a}$ to the second imaging unit 12 at the second image capture position B is automatically determined relative to the first imaging unit 11 at the first image capture position A. The translation distances (not shown) to the first and second imaging units 11 and 12 at the second image capture position B from the second imaging unit 12 at the first image capture position A are also automatically determined in a like manner. The translation distance $D_{1a}$ is calculated prior to the translation distance $D_{2a}$, by way of example. The translation distance $D_{2a}$ may be calculated prior to the translation distance $D_{1a}$. The translation distances $D_{1a}$ and $D_{2a}$, which are calculated by the translation distance calculator 25, are inputted to the three-dimensional data calculator 26.

The three-dimensional data calculator 26 associates coordinates (u, v) on the image $P_{AL}$ with coordinates (X, Y, Z) in the real space based on a mathematical expression 1 where "w" denotes parallax between the image $P_{AL}$ and the image $P_{BL}$, "f" denotes a focal length for taking the image $P_{AL}$, and "p" denotes a pixel pitch in the image sensor 11b. The parallax is represented by a difference between the coordinate(s) of the pixel which corresponds to the feature point and the coordinate(s) of the pixel which corresponds to the corresponding point. For example, in a case where the three-dimensional measurement apparatus 10 is rotated only in the horizontal direction from the first image capture position A to the second image capture position B, the parallax is represented by a difference ($w = u_f - u_c$) between the u coordinate ("$u_f$") of the feature point and the u coordinate ("$u_c$") of the corresponding point. Note that the coordinates on the image $P_{BL}$ or the image $P_{BR}$ are converted into the coordinates in the real space by changing or substituting the translation distance $D_{1a}$, the parallax "w", the focal length "f", and the pixel pitch "p" as appropriate in the mathematical expression 1.

$$\begin{bmatrix} X \\ Y \\ Z \end{bmatrix} = \begin{bmatrix} u \times \frac{D_{1a}}{w} \\ v \times \frac{D_{1a}}{w} \\ \frac{f}{p} \times \frac{D_{1a}}{w} \end{bmatrix}$$ (Mathematical expression 1)

The three-dimensional data calculator 26 uses the coordinates in the real space, which are calculated from the coordinates on the image $P_{AL}$, to calculate the three-dimensional data of the object, as described above. In a case where the dimension in the real space, for example, the distance between the feature points is calculated, the dimension calculated by the three-dimensional data calculator 26 is superimposed on the image $P_{AL}$. The image $P_{AL}$ with the dimension superimposed is displayed on the display 16. In a case where the three-dimensional data calculator 26 calculates the three-dimensional model data, the three-dimensional model data is displayed on the display 16.

Note that the detectors and calculators 21 to 26 of the measurement unit 15 are composed of a memory, various processing circuits, a CPU for centrally controlling the operations of the circuits and the like, and a control program. The circuits and the like constituting the detectors and the calculators 21 to 26 may be partly or entirely shared by the detectors and the calculators 21 to 26.

Figure 5:
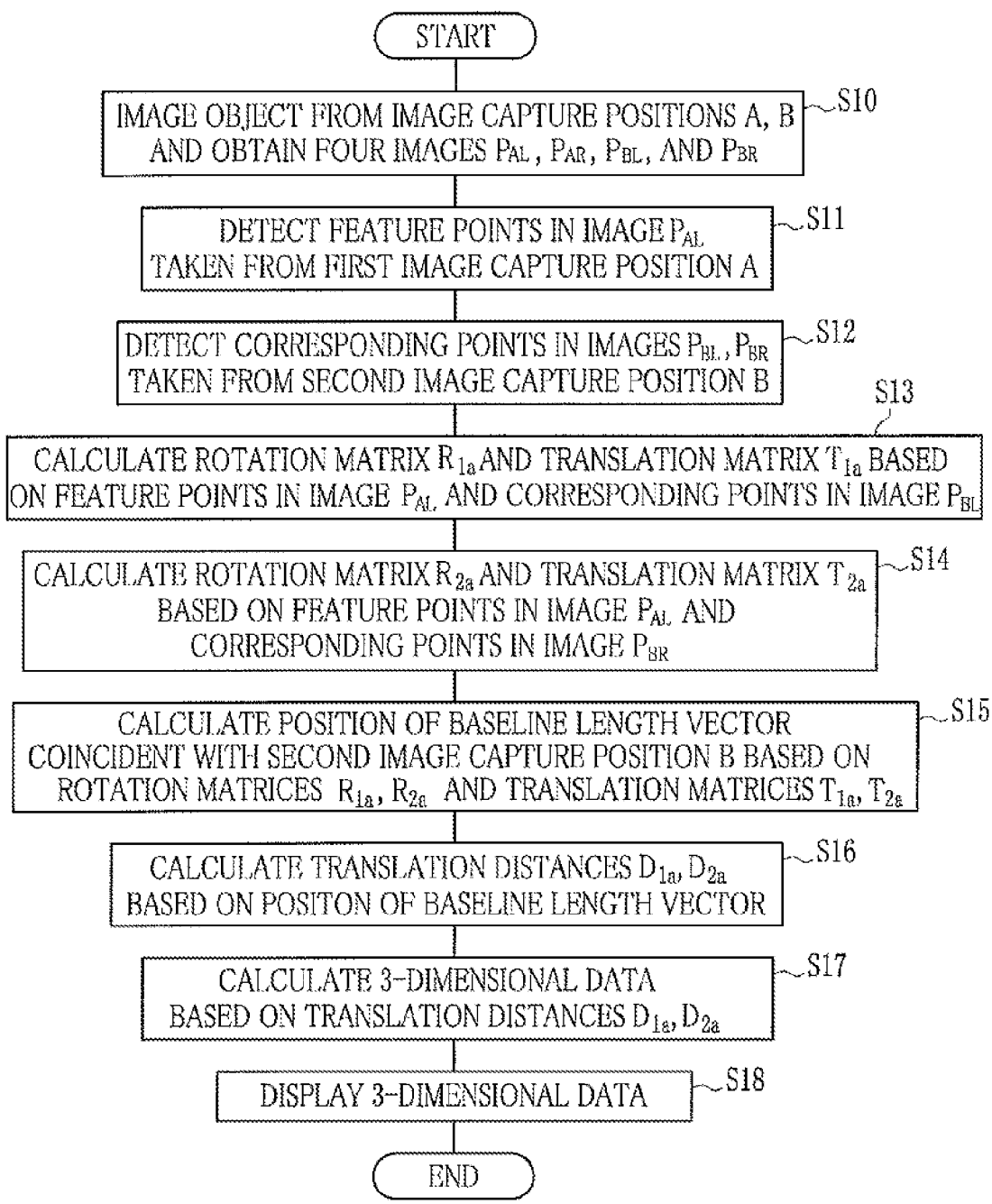
FIG. 5 is a flowchart illustrating a procedure of three-dimensional measurement.

An operation of the above-described three-dimensional measurement apparatus 10 is described. As illustrated in FIG. 5, images of the object whose three-dimensional data is to be measured are taken from the first image capture position A and the second image capture position B with the three-dimensional measurement apparatus 10. Thereby, four images $P_{AL}$, $P_{AR}$, $P_{BL}$, and $P_{BR}$ are taken ("imaging step" denoted as S10). Here, it is preferred that the object is located at the nearest position possible in the overlapping imaging fields of the first and second imaging units 11 and 12. Resolving power of the three-dimensional data, which will be described below, is reduced as the object distance increases. In particular, the resolving power in the depth direction of the image is significantly reduced as the object distance increases. To be more specific, it is preferred that the object to be imaged is located within a range of 1 to 3 m. In this case, the three-dimensional measurement apparatus 10 has the resolving power in the order of 1%, in the depth direction, relative to the object distance.

Figure 6:
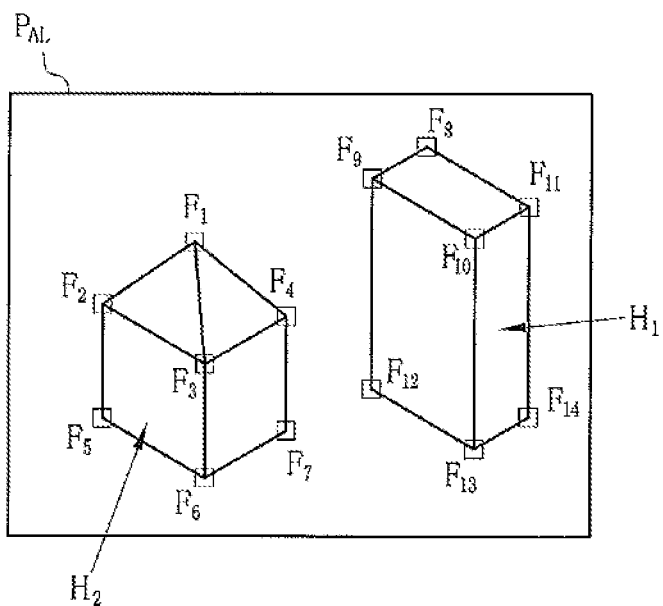
FIG. 6 is an explanatory view schematically illustrating feature points.

After the four images $P_{AL}$, $P_{AR}$, $P_{BL}$, and $P_{BR}$ are obtained, the feature points in the image $P_{AL}$ are detected ("feature point detection step" denoted as S11). For example, as illustrated in FIG. 6, in a case where the objects $H_1$ and $H_2$ are contained in the image $P_{AL}$, the feature point detector 21 detects corners or the like of each of the objects $H_1$ and $H_2$ as feature points $F_1$ to $F_{14}$. Since there are fourteen feature points $F_1$ to $F_{14}$, eight feature points are selected to be used for calculating the three-dimensional data. For example, the feature points $F_1$, $F_3$, $F_4$, $F_9$, $F_9$, $F_{11}$, $F_{13}$, and $F_{14}$ are selected.

Figure 7:
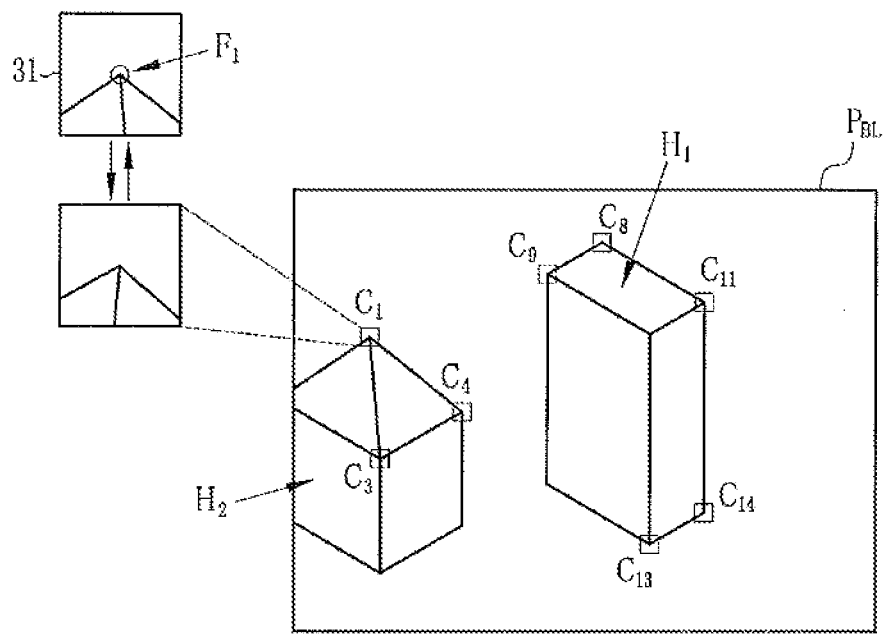
FIG. 7 is an explanatory view schematically illustrating detection of corresponding points.

After the feature points are thus detected and selected, the corresponding point detector 22 detects the corresponding points in the images $P_{BL}$ and $P_{BR}$ ("corresponding point detection step" denoted as S12). To be more specific, as illustrated in FIG. 7, the corresponding point detector 22 cuts out a portion (a partial image 31) from the image $P_{AL}$, in which the feature points have been detected. The partial image 31 contains the feature point $F_1$. The corresponding point detector 22 compares the partial image 31 with portions of the image $P_{BL}$ while the partial image 31 is scaled up (or down) or rotated as necessary. The portion of the image $P_{BL}$ with the highest coincidence with the partial image 31 is detected as the corresponding point $C_1$. In a like manner, the corresponding points $C_3$, $C_4$, $C_8$, $C_9$, $C_{11}$, $C_{13}$, and $C_{14}$ which correspond to the rest of the feature points $F_3$, $F_4$, $F_8$, $F_9$, $F_{11}$, $F_{13}$, and $F_{14}$ are detected, respectively. The corresponding point detector 22 detects the corresponding points in the image $P_{BR}$ in a like manner.

Note that the positions and the orientations of the objects $H_1$ and $H_2$ in the image $P_{BL}$ differ from those of the objects $H_1$ and $H_2$ in the image $P_{BL}$ due to the parallax caused by the image capture positions and the imaging orientations or directions. For this reason, there are cases where the corresponding point which corresponds to the selected feature point may not be detected in the image $P_{BL}$. For example, the feature points $F_2$ and $F_5$ (see FIG. 6) are not contained in the image $P_{BL}$ (see FIG. 7), so that the corresponding points which correspond to the feature points $F_2$ and $F_5$ cannot be detected in the image $P_{BL}$. A portion with the highest coincidence with the feature point may be detected as the corresponding point even though the detected portion is unrelated to the feature point. In the cases where the corresponding point cannot be detected or the highest coincidence is less than a predetermined level, the feature points are reselected. Then the corresponding points which correspond to the reselected feature points are redetected.

After the corresponding points are detected, the rotation matrix and the translation matrix are calculated based on the feature points and the corresponding points (S13 and S14 in FIG. 5). Each of S13 and S14 is both the rotation matrix calculation step and the translation matrix calculation step.

The rotation matrix $R_{1a}$ and the translation matrix $T_{1a}$ are calculated based on the coordinates of the feature point in the image $P_{AL}$ and the coordinates of the corresponding point in the image $P_{BL}$ (S13). The rotation matrix $R_{2a}$ and the translation matrix $T_{1a}$ are calculated based on the coordinates of the feature point in the image $P_{AL}$ and the coordinates of the corresponding point in the image $P_{BR}$ (S14). In other words, in S13 and S14, the rotation matrix and the translation matrix are calculated for each of a pair (first pair) of the first imaging unit 11 at the first image capture position A and the first imaging unit 11 at the second image capture position B and a pair (second pair) of the first imaging unit 11 at the first image capture position A and the second imaging unit 12 at the second image capture position B.

After the rotation matrices $R_{1a}$ and $R_{2a}$ and the translation matrices $T_{1a}$ and $T_{2a}$ are calculated, the translation distance calculator 25 uses the rotation matrices $R_{1a}$ and $R_{2a}$ and the translation matrices $T_{1a}$ and $T_{2a}$ to determine a position of a baseline length vector 32 (see FIG. 8) at the second image capture position B (S15). Then, the translation distance calculator 25 calculates the translation distance $D_{1a}$ based on the determined position of the baseline length vector 32 at the second image capture position B (S16). S15 and S16 constitute a translation distance calculation step.

Figure 8:
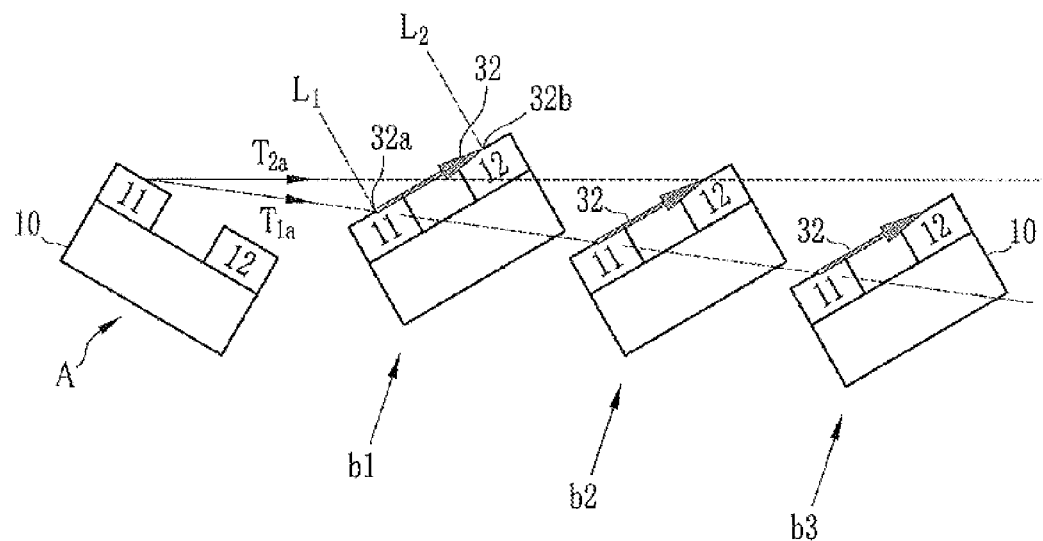
FIG. 8 is an explanatory view illustrating a principle for determining a second image capture position B.

As illustrated in FIG. 8, the baseline length vector 32 has the size of the baseline length BL and the direction determined by the rotation matrices $R_{1a}$ and $R_{2a}$. An initial point 32a of the baseline length vector 32 is located on the first imaging unit 11 of the three-dimensional measurement apparatus 10 at the second image capture position B. A terminal point 32b of the baseline length vector 32 is located on the second imaging unit 12 of the three-dimensional measurement apparatus 10 at the second image capture position B. The translation distance calculator 25 places the initial point 32a of the baseline length vector 32 on an arbitrary point on a straight line (hereinafter referred to as the direction $T_{1a}$) extending in a direction indicated by the translation matrix $T_{1a}$ from the first imaging unit 11 at the first image capture position A. The translation distance calculator 25 calculates a distance between the terminal point 32b and a straight line (hereinafter referred to as the direction $T_{2a}$) extending in a direction indicated by the translation matrix $T_{2a}$ from the first imaging unit 11 at the first image capture position A. The translation distance calculator 25 calculates the coordinates of the initial point 32a and the terminal point 32b of the baseline length vector 32 which make the distance between the direction (line) $T_{2a}$ and the terminal point 32b minimum.

The direction $T_{1a}$ represents a direction in which the first imaging unit 11 at the second image capture position B is located. The direction $T_{2a}$ represents a direction in which the second imaging unit 12 at the second image capture position B is located. The distance between the directions (lines) $T_{1a}$ and $T_{2a}$ increases as the directions (lines) $T_{1a}$ and $T_{2a}$ become away from the first image capture position A, but the baseline length BL is invariable. Suppose the initial point 32a of the baseline length vector 32 is placed on an arbitrary point on the direction (line) $T_{1a}$ and assume that the arbitrary point is the position of the first imaging unit 11 at the second image capture position, the terminal point 32b of the baseline length vector 32, which indicates the position of the second imaging unit 12 at the second image capture position B, is supposed to be on the direction (line) $T_{2a}$ when the arbitrary point is the true second image capture position B.

In other words, as illustrated by the characters b1 and b3, in a case where the initial point 32a of the baseline length vector 32 is placed too close or too far from the first image capture position A, the terminal point 32b becomes away from the direction $T_{2a}$. As shown by the character b2, the position at which the terminal point 32b becomes closest to the direction $T_{2a}$ (ideally, the position at which the terminal point 32b is coincident with the direction $T_{2a}$) is determined to be the second image capture position B by calculating the distance between the terminal point 32b and the direction $T_{2a}$ while the position of the initial point 32a is moved along the direction $T_{1a}$.

The positions of the first and second imaging units 11 and 12 at the second image capture position B and the translation distances $D_{1a}$ and $D_2$ of the imaging units 11 and 12 relative to the first imaging unit 11 at the first image capture position A are determined based on the position of the second image capture position B thus determined. In other words, the position of the initial point 32a of the baseline length vector 32 is the position of the first imaging unit 11 at the second image capture position B. The position of the terminal point 32b is the position of the second imaging unit 12 at the second image capture position B. Accordingly, the translation distance $D_{1a}$ is the distance between the first imaging unit 11 at the first image capture position A and the initial point 32a. The translation distance $D_{2a}$ is the distance between the first imaging unit 11 at the first image capture position A and the terminal point 32b.

Figure 9:
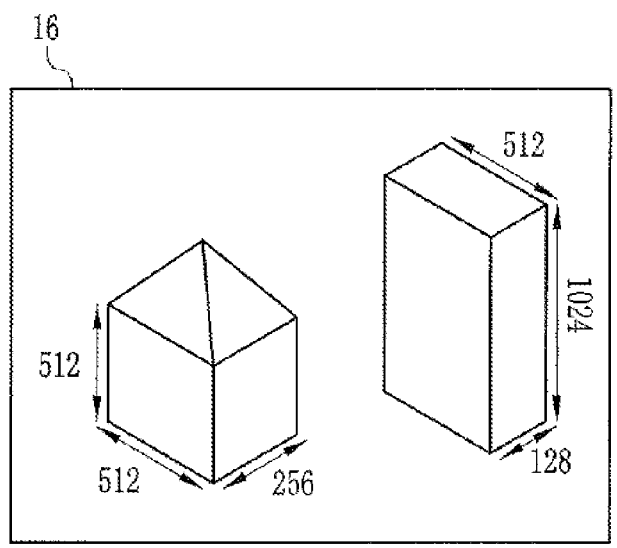
FIG. 9 is an explanatory view illustrating three-dimensional data displayed on a display.

After the translation distances $D_{1a}$ and $D_{2a}$ are calculated as described above, the three-dimensional data calculator 26 associates the coordinates in the image $P_{AL}$ with the coordinates in the real space with the use of the mathematical expression 1 and the translation distance $D_{1a}$, the focal length "f" for taking the image $P_{AL}$, the parallax "w", the pixel pitch "p" of the image sensor 11b. Thereby the three-dimensional data of the objects $H_1$ and $H_2$ is calculated ("three-dimensional data calculation step" denoted as S17). The three-dimensional data calculator 26 displays the calculated three-dimensional data on the display 16 ("display step" denoted as S18). For example, as illustrated in FIG. 9, in a case where the distances between the feature points are calculated as the three-dimensional data, the distances between the feature points are superimposed on the image $P_{AL}$. The image with the distances between the feature points superimposed is displayed on the display 16.

As described above, the three-dimensional measurement apparatus 10 comprises the first imaging unit 11 and the second imaging unit 12 with the known baseline length BL, and uses the images $P_{AL}$, $P_{BL}$, and $P_{BR}$ of the object which are taken from two image capture positions with the first and second imaging units 11 and 12. Thereby the three-dimensional measurement apparatus 10 calculates the positional relationship before and after the displacement (or change in position) (that is, the translation distances $D_{1a}$ and $D_{2a}$) and the three-dimensional data. The three-dimensional measurement apparatus 10 eliminates the need for the precise calibration to form a huge stereo camera as described in Japanese Patent Laid-Open Publication Nos. 2007-263669 and 2005-241323. The three-dimensional measurement apparatus 10 also eliminates the need for imaging the reference object simultaneously with the object as described in US 2011/0249117 (corresponding to Japanese Patent Laid-Open Publication No. 2011-232330). Instead, the three-dimensional data of the object is calculated easily and with high accuracy just by imaging the object with the three-dimensional measurement apparatus 10 while the three-dimensional measurement apparatus 10 is moved or carried.

As for the calculation of the three-dimensional data, the three-dimensional measurement apparatus 10 uses the pair of the images $P_{AL}$ and $P_{BL}$ and the pair of the images $P_{AL}$ and $P_{BR}$ to calculate the rotation matrix and the translation matrix. This means that each of the pair of the first imaging unit 11 at the first image capture position A and the first imaging unit 11 at the second image capture position B and the pair of the first imaging unit 11 at the first image capture position A and the second imaging unit 12 at the second image capture position B is substantially equivalent to forming a huge stereo camera. The baseline length (the translation distances $D_{1a}$ or $D_{2a}$) of each pair is longer than the baseline length BL. For this reason, the three-dimensional measurement apparatus 10 calculates the three-dimensional data with high accuracy.

Second Embodiment

The first embodiment is described on the premise that the correct baseline length vector 32 is obtained, and there exists the position of the baseline length vector 32 at which the terminal point 32b of the baseline length vector 32 is coincident with the direction (or the line) $T_{2a}$ in the case where the initial point 32a of the baseline length vector 32 is placed on the direction (or the line) $T_{1a}$. However, in a case where the baseline length vector 32 is incorrect in the first place, the position of the baseline length vector 32 does not represent the second image capture position B even if the distance between the terminal point 32b and the direction $T_{2a}$ is at a minimum.

Figure 10:
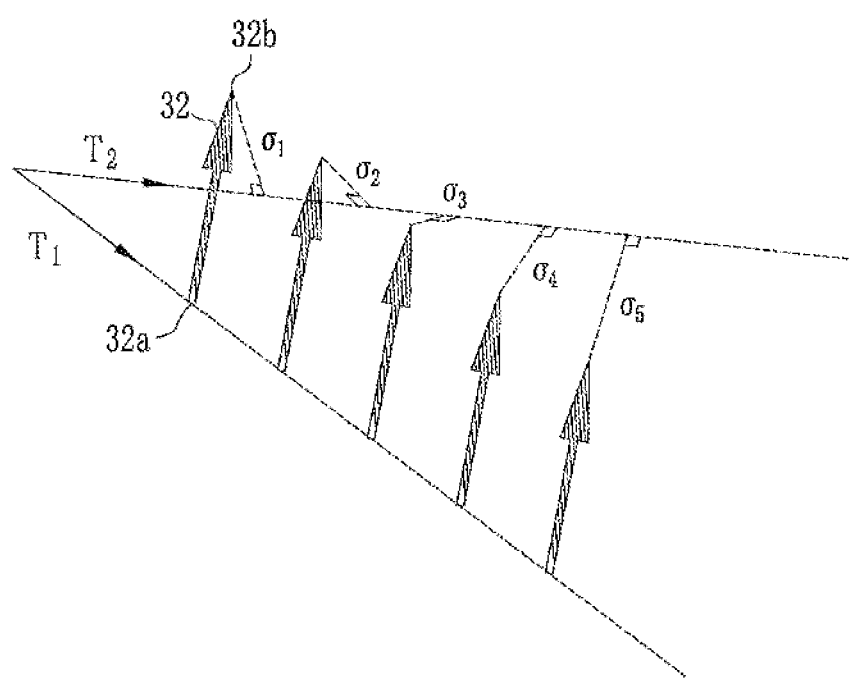
FIG. 10 is an explanatory view illustrating a relationship between a baseline length vector and a $T_{1a}$-$T_{2a}$ plane.

As illustrated in FIG. 10, the baseline length vector 32 may be tilted relative to a plane (hereinafter, referred to as the $T_{1a}$-$T_{2a}$ plane), which is defined by the directions $T_{1a}$ and $T_{2a}$. For example, in FIG. 10, distances $\sigma_1$ to $\sigma_5$ between the terminal point 32b and the direction $T_{2a}$ are calculated while the initial point 32a is moved along the direction $T_{1a}$. In this example, the distance $\sigma_3$ is at a minimum. In the case of the first embodiment, the position of the baseline length vector 32 at which the distance between the terminal point 32b and the direction $T_{2a}$ is $\sigma_3$ is determined to be the second image capture position B.

In this case, however, the baseline length vector 32 is supposed to be in the $T_{1a}$-$T_{2a}$ plane, so that it is considered that at least one of the direction of the baseline length vector 32 and the $T_{1a}$-$T_{2a}$ plane is incorrect or there exists a large error. Naturally, the position of the baseline length vector 32 does not represent the second image capture position B even if the distance between the terminal point 32b and the direction $T_{2a}$ is at the minimum. There are cases where the distance $\sigma_3$ takes a large value even if it is the smallest of the distances $\sigma_1$ to $\sigma_5$. Thus, it is necessary to recalculate the rotation matrices $R_{1a}$ and $R_{2a}$ and the translation matrices $T_{1a}$ and $T_{2a}$ in the case where the baseline length vector 32 is above or out of the $T_{1a}$-$T_{2a}$ plane. This is because the baseline length vector 32 is defined by the rotation matrices $R_{1a}$ and $R_{2a}$ and the $T_{1a}$-$T_{2a}$ plane is defined by the translation matrices $T_{1a}$ and $T_{2a}$ as described above.

Figure 11:
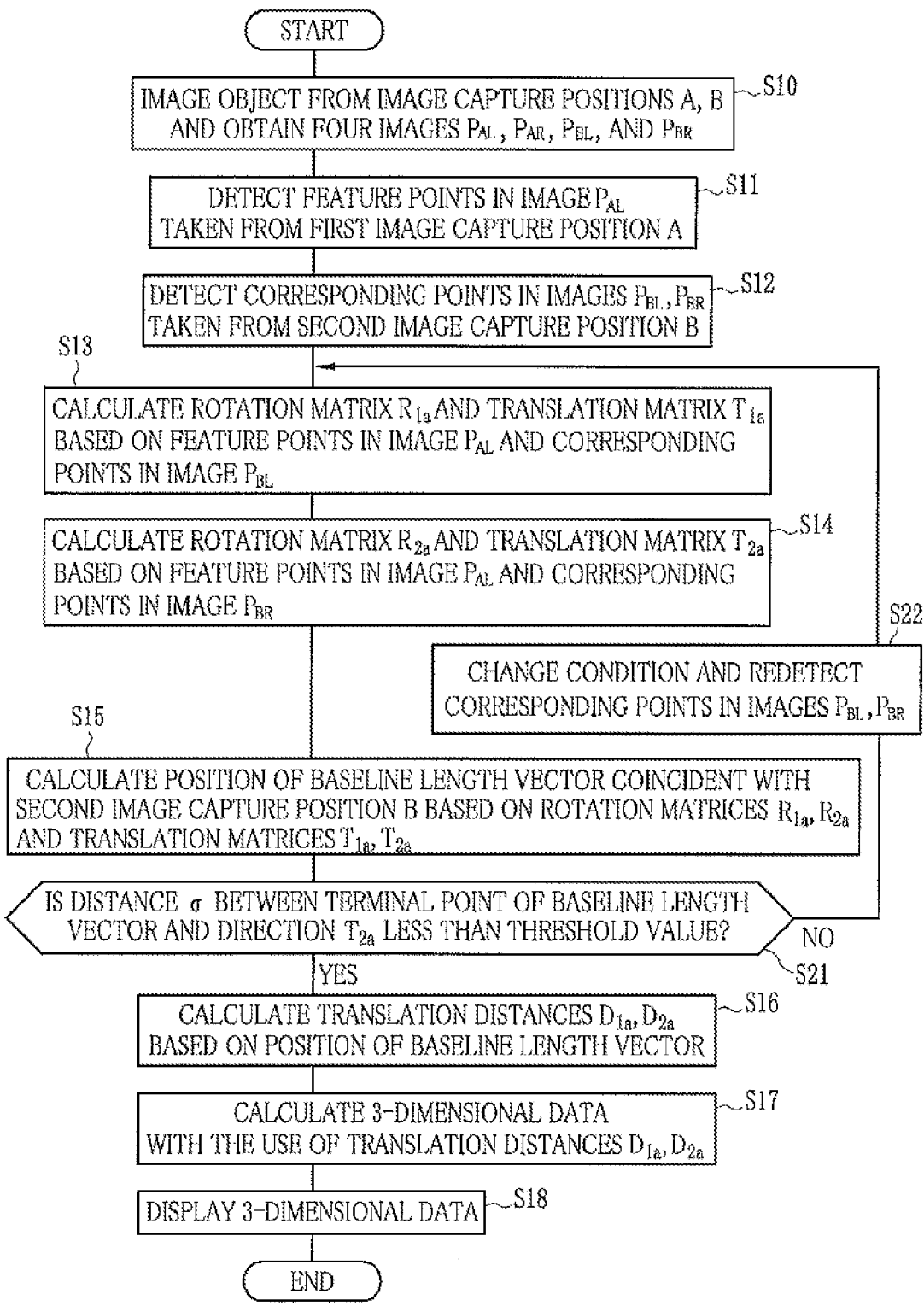
FIG. 11 is a flowchart illustrating a procedure of the three-dimensional measurement according to a second embodiment.

For this reason, as illustrated in FIG. 11 byway of example, reliability of the rotation matrices $R_{1a}$ and $R_{2a}$ and the translation matrices $T_{1a}$ and $T_{2a}$ is examined by comparing a minimum value (minimum distance) $\sigma_{min}$ between the terminal point 32b and the direction $T_{2a}$ with a threshold value $\sigma_{TH}$ ("reliability examination step" denoted as S21) in determining the position of the baseline length vector 32, which represents the second image capture position B. In a case where the minimum value $\sigma_{min}$ is less than the predetermined threshold value $\sigma_{TH}$ ($\sigma_{min} < \sigma_{TH}$), the baseline length vector 32 is situated in or substantially in the $T_{1a}$-$T_{2a}$ plane, so that the position of the baseline length vector 32 is reliable. Based on the position of the baseline length vector 32, the translation distances $D_{1a}$ and $D_{2a}$ and the like are calculated (S16 to S18, the same as those in the first embodiment).

In the case where the minimum value $\sigma_{min}$ is greater than or equal to the predetermined threshold value $\sigma_{TH}$ ($\sigma_{min} \geq \sigma_{TH}$), it is determined that the baseline length vector 32 is above or out of the $T_{1a}$-$T_{2a}$ plane. In this case, a condition is changed and the corresponding points are redetected in the images $P_{BL}$ and $P_{BR}$ ("corresponding point redetection step" denoted as S22). Based on the redetected corresponding points, the rotation matrices $R_{1a}$ and $R_{2a}$ and the translation matrices $T_{1a}$ and $T_{2a}$ are recalculated. Based on the recalculated rotation matrices $R_{1a}$ and $R_{2a}$ and the translation matrices $T_{1a}$ and $T_{2a}$, the position of the baseline length vector 32, which represents the position of the second image capture position B, is calculated (S13 to S16, the same as those in the first embodiment).

As described above, improving the accuracy of detecting the corresponding points, through changing the condition and redetecting the corresponding points, reduces the errors in the rotation matrices $R_{1a}$ and $R_{2a}$ and the translation matrices $T_{1a}$ and $T_{2a}$. The minimum value $\sigma_{min}$ is reduced to be less than the threshold value $\sigma_{TH}$ by improving the accuracy of the rotation matrices $R_{1a}$ and $R_{2a}$ and the translation matrices $T_{1a}$ and $T_{2a}$. As a result, the translation distance and the three-dimensional data are calculated accurately. The incorrect calculation of the second image capture position B, which results in the three-dimensional data with a large error, is prevented.

Note that changing a condition in redetecting the corresponding points may include any one of or any combination of the following: changing the combination of the feature points, changing the size of the partial image 31, changing a magnification ratio or a reduction ratio (a scaling ratio) of the partial image 31, magnifying or rotating the partial image 31 in a case where the corresponding points are detected without magnifying or rotating the partial image 31 to expedite the processing, changing the algorithm for detecting the corresponding points, or the like.

In the second embodiment, the corresponding points are redetected. In addition, the feature points may be redetected or reselected prior to the redetection of the corresponding points. In order to redo the detection of the feature points, a different combination of the feature points may be selected from the previously detected feature points, or the algorithm for detecting the feature points may be changed to redetect the feature points. As described in the second embodiment, the feature points may be redetected in the case where the minimum value $\sigma_{min}$ is greater than or equal to the threshold value $\sigma_{TH}$ even after the redetection of the corresponding points. On the contrary, the redetection of the feature points may be attempted first. Then, in the case where the minimum value $\sigma_{min}$ is greater than or equal to the threshold value $\sigma_{TH}$ even after the redetection of the feature points, the corresponding points are redetected.

Third Embodiment

In the first and second embodiments, with the use of the images $P_{AL}$, $P_{BL}$, and $P_{BR}$, the rotation matrix $R_{1a}$ and the translation matrix $T_{1a}$ are calculated with respect to the pair of the first imaging unit 11 at the first image capture position A and the first imaging unit 11 at the second image capture position B. The rotation matrix $R_{2a}$ and the translation matrix $T_{2a}$ are calculated with respect to the pair of the first imaging unit 11 at the first image capture position A and the second imaging unit 12 at the second image capture position B. The rotation matrix and the translation matrix may be calculated with respect to a different pair of the imaging units. There are four pairs of the imaging units in total. Two of the four pairs may be selected arbitrarily to calculate the three-dimensional data.

Figure 12:
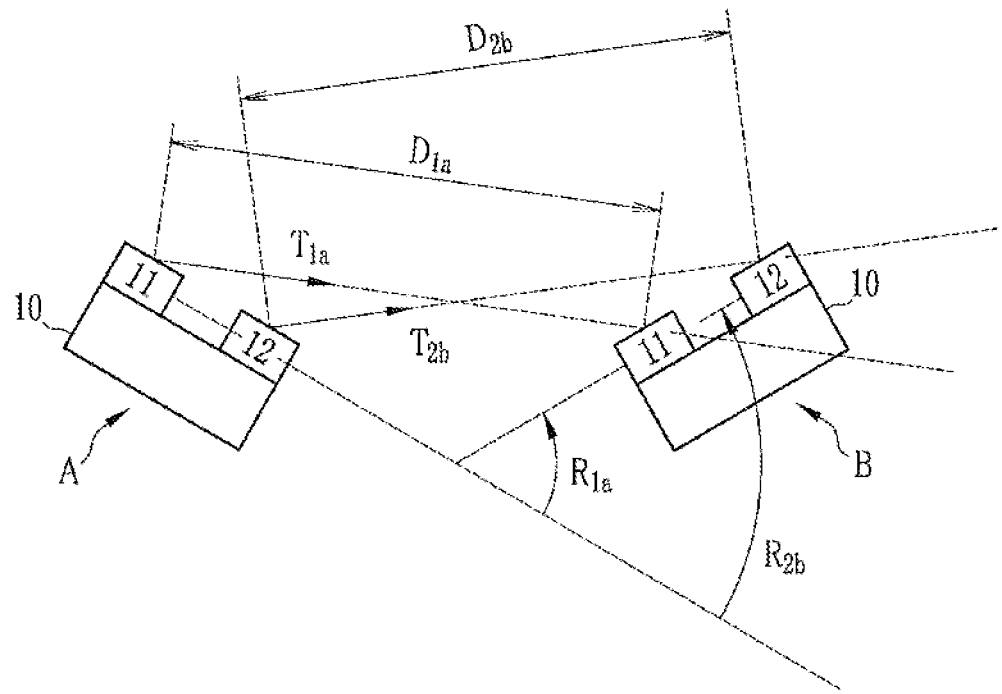
FIG. 12 is an explanatory view illustrating the rotation matrices, the translation matrices, and translation distances calculated according to the third embodiment.

For example, as illustrated in FIG. 12, the rotation matrix $R_{1a}$ and the translation matrix $T_{1a}$ are calculated with respect to the pair of the first imaging unit 11 at the first image capture position A and the first imaging unit 11 at the second image capture position B. A rotation matrix $R_{2b}$ and a translation matrix $T_{2b}$ are calculated with respect to the pair of the second imaging unit 12 at the first image capture position A and the second imaging unit 12 at the second image capture position B. The rotation matrices $R_{1a}$ and $R_{2b}$ and the translation matrices $T_{1a}$ and $T_{2b}$ are used to calculate the translation distances $D_{1a}$ and $D_{2b}$ and the three-dimensional data.

Figure 13:
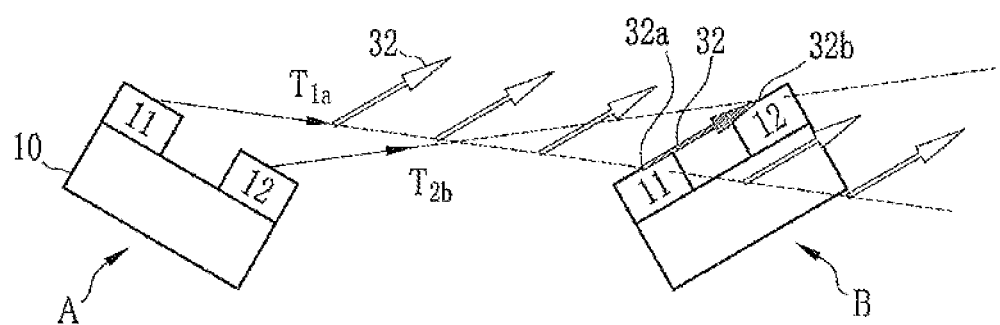
FIG. 13 is an explanatory view illustrating a principle for determining the second image capture position according to the third embodiment.

In an example illustrated in FIG. 13, the direction $T_{1a}$ and the direction $T_{2b}$ cross each other, but the baseline length vector 32, which represents the second image capture position B, is determined in the manner similar to those in the first and second embodiments. The distance between the terminal point 32b of the baseline length vector 32 and the direction (line) $T_{2b}$ increases as the baseline length vector 32 becomes away from the true second image capture position B. The second image capture position B is determined to be the position of the baseline length vector 32 at which the distance between the terminal point 32b of the baseline length vector 32 and the direction $T_{2b}$ is at a minimum.

To use the rotation matrices $R_{1a}$ and $R_{2b}$ and the translation matrices $T_{1a}$ and $T_{2b}$, which are calculated with respect to the pair of the first imaging unit 11 at the first image capture position A and the first imaging unit 11 at the second image capture position B and the pair of the second imaging unit 12 at the first image capture position A and the second imaging unit 12 at the second image capture position B, it is necessary to detect the feature points in each of the images $P_{AL}$ and $P_{AR}$. The corresponding points which correspond to the feature points in the image $P_{AL}$ are detected in the image $P_{BL}$. The corresponding points which correspond to the feature points in the image $P_{AR}$ are detected in the image $P_{BR}$. For this reason, in the case where the rotation matrices $R_{1a}$ and $R_{2b}$ and the translation matrices $T_{1a}$ and $T_{2b}$ are used, the number of the feature point detection steps is increased from that in the first embodiment. However, this example with the increased feature point detection steps is resistant to the influence of the error in detecting the feature points and the corresponding points. For example, in the first embodiment, the amount of the error in detecting the feature points or the corresponding points directly affects the amount of an error in calculating the three-dimensional data. In this embodiment, however, in the case where the rotation matrices $R_{1a}$ and $R_{2b}$ and the translation matrices $T_{1a}$ and $T_{2b}$ are used as described above, the combination of the feature points and the corresponding points which are used for calculating the rotation matrix $R_{1a}$ and the translation matrix $T_{1a}$ is detected individually from the combination of the feature points and the corresponding points which are used for calculating the rotation matrix $R_{2b}$ and the translation matrix $T_{2b}$. Even if one of the combinations has the error with the same amount as that in the first embodiment, the error in calculating the three-dimensional data is approximately half the amount of the error as that in the first embodiment in a case where the other combination does not have an error.

Figure 14:
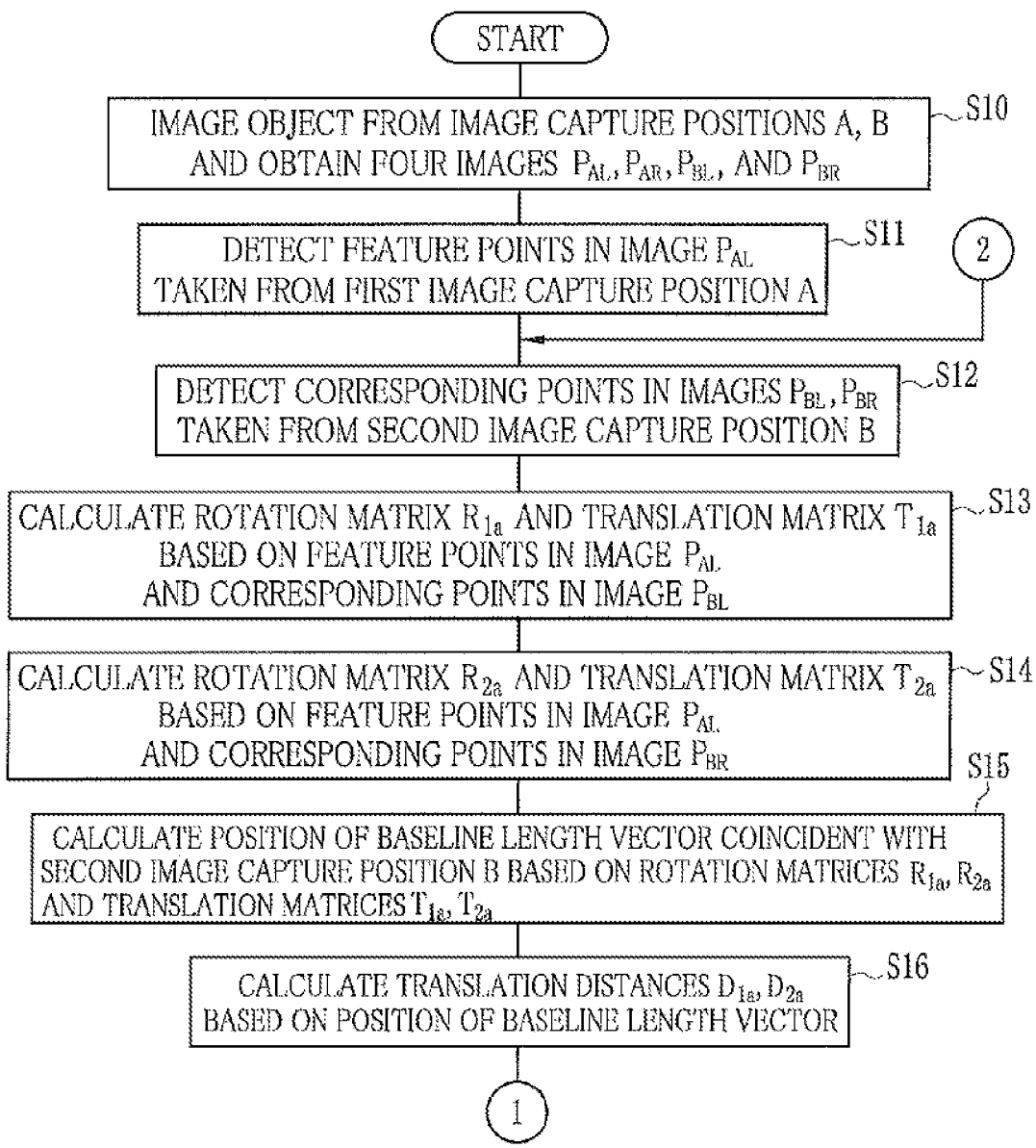
FIG. 14 is a flowchart illustrating a preferred procedure of the three-dimensional measurement according to the third embodiment.
Figure 15:
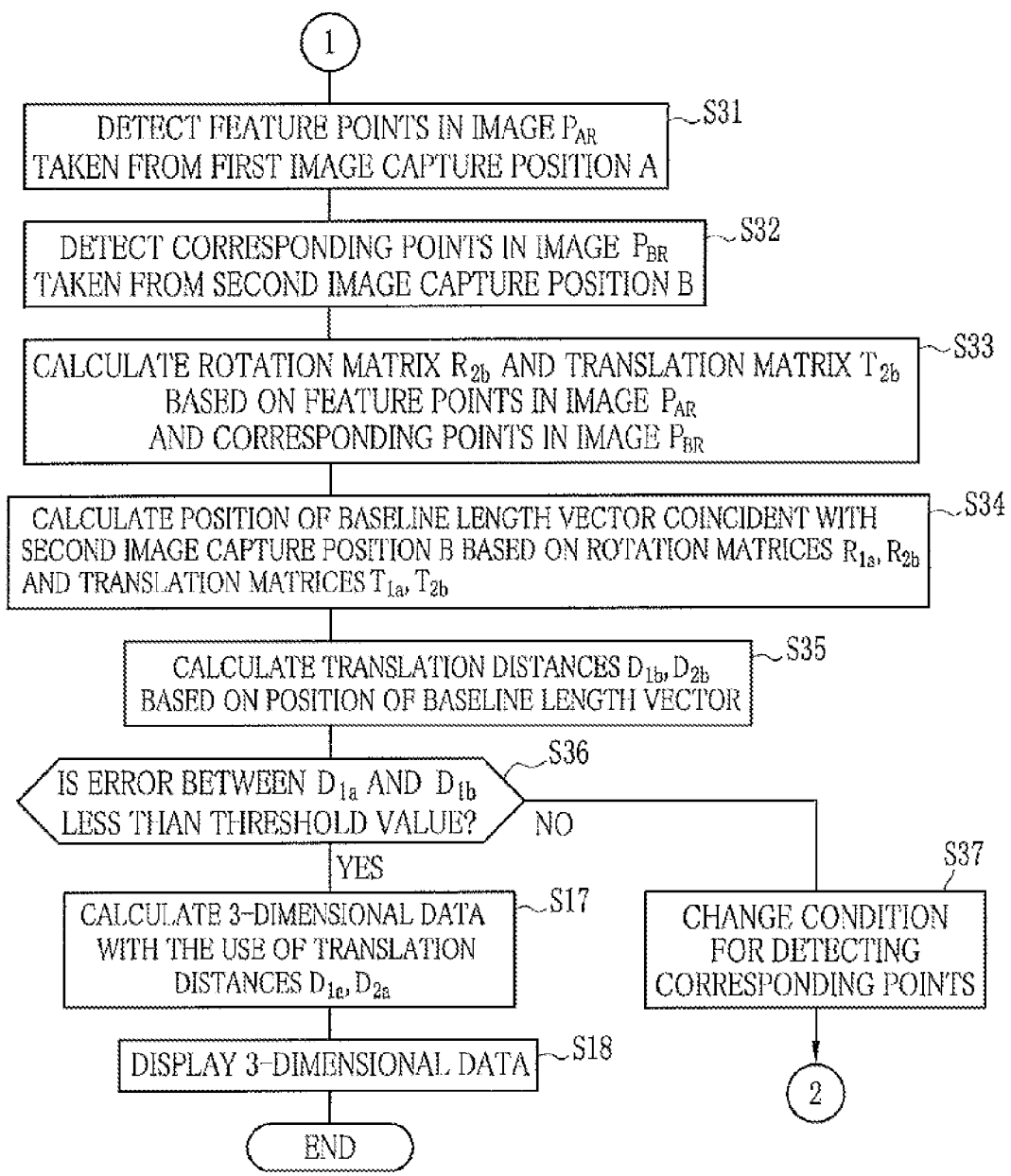
FIG. 15 is a flowchart illustrating a preferred procedure of the three-dimensional measurement according to the third embodiment.

It is especially preferred to use the rotation matrices $R_{1a}$ and $R_{2b}$ and the translation matrices $T_{1a}$ and $T_{2b}$ as follows. As illustrated in FIGS. 14 and 15, first, the rotation matrices $R_{1a}$ and $R_{2a}$ and the translation matrices $T_{1a}$ and $T_{2a}$ are calculated based on the images $P_{AL}$, $P_{AR}$, and $P_{BR}$ and then the translation distances $D_{1a}$ and $D_{2a}$ are calculated (S10 to S16) in the manner the same as or similar to the first embodiment. Next, the feature points are detected in the image $P_{AR}$. The feature points to be used are selected from the detected feature points ("second feature point detection step" denoted as S31). The corresponding points, which correspond to the selected feature points, are detected in the image $P_{BR}$ ("second corresponding point detection step" denoted as S32). Based on the feature points in the image $P_{AR}$ and the corresponding points in the image $P_{BR}$, the rotation matrix $R_{2b}$ and the translation matrix $T_{2b}$ are calculated (S33). The step "S33" corresponds to a second rotation matrix calculation step and a second translation matrix calculation step. The position of the baseline length vector 32, which corresponds to the second image capture position B, is determined based on the rotation matrix $R_{2b}$ and the translation matrix $T_{2b}$ thus calculated and the rotation matrix $R_{1a}$ and the translation matrix $T_{1a}$ calculated in S14 (S34). The translation distance $D_{1a}$ is calculated based on the position of the baseline length vector 32, which corresponds to the second image capture position B (S35).

The calculated translation distance $D_{1a}$ is the distance between the first imaging unit 11 at the first image capture position A and the first imaging unit 11 at the second image capture position B. However, the combination of the images, in other words, the rotation matrices and the translation matrices used are different from those for the translation distance calculated in S16, so that the translation distance calculated in S35 may differ from that calculated in S16. Hereinafter, the translation distance calculated in S34 and S35 is denoted as the translation distance $D_{1b}$ for the sake of distinction.

The three-dimensional data calculator 26 compares each of the translation distances $D_{1a}$ and $D_{1b}$ with a predetermined threshold value $D_{TH}$ (S36). The translation distance $D_{1a}$ and the translation distance $D_{1b}$ are supposed to represent the same distance. The combination of the images used for calculating the translation distance $D_{1b}$ differs from the combination of the images used for calculating the translation distance $D_{1a}$. In the case where the difference between the translation distance $D_{1a}$ and the translation distance $D_{1b}$ is less than the threshold value $D_{TH}$ ($|D_{1a}-D_{1b}|<D_{TH}$) the three-dimensional data calculator 26 uses the translation distance $D_{1a}$ to calculate the three-dimensional data and displays the three-dimensional data on the display 16 (S17 and S18). Since the error between the distances ($D_{1a}$ and $D_{1b}$ calculated by the two different types of calculations, respectively) is small, the first calculation is determined as reliable.

In the case where the difference between the translation distance $D_{1a}$ and the translation distance $D_{1b}$ is greater than or equal to the threshold value $D_{TH}$ ($|D_{1a}-D_{1b}|\geq D_{TH}$), it is determined that at least one of the translation distance $D_{1a}$ and the translation distance $D_{1b}$ has a large error. In this case, the condition for detecting the corresponding points is changed (S37) in the manner the same as or similar to the second embodiment. The corresponding points are redetected using the changed condition. The rotation matrices, the translation matrices, and the translation distances $D_{1a}$ and $D_{1b}$ are recalculated. The condition to be changed in redetecting the corresponding points is the same as that described in the second embodiment. The feature points may be redetected or reselected in the manner the same as or similar to the second embodiment.

As described above, the use of the rotation matrices $R_{1a}$ and $R_{2b}$ and the translation matrices $T_{1a}$ and $T_{2b}$ is efficient because it allows the calculation of the translation distance, and in addition, checking the calculation accuracy of the three-dimensional data.

Note that, in the third embodiment, the translation distance $D_{1a}$ is compared with the translation distance $D_{1b}$. Instead, the three-dimensional data calculated using the translation distance $D_{1a}$ may be compared with the three-dimensional data calculated using the translation distance $D_{1b}$. The comparison between the three-dimensional data refers to, for example, the comparison between the coordinates in the real space with respect to the same feature points, the comparison between the distances between the same feature points, or the like.

Note that, in the third embodiment, the three-dimensional data is calculated based on the translation distance $D_{1a}$ in the case where the difference between the translation distance $D_{1a}$ and the translation distance $D_{1b}$ is less than the threshold value $D_{TH}$. The three-dimensional data may be calculated based on the translation distance $D_{1b}$ instead.

Note that, in the third embodiment, the rotation matrices and the translation matrices of the first pair (the first imaging unit 11 at the first image capture position A and the first imaging unit 11 at the second image capture position B), the second pair (the first imaging unit 11 at the first image capture position A and the second imaging unit 12 at the second image capture position B), and the third pair (the second imaging unit 12 at the first image capture position A and the second imaging unit 12 at the second image capture position B) are used. The two pairs used for calculating the translation distance $D_{1a}$ and the two pairs used for calculating the translation distance $D_{1b}$ may be selected arbitrarily. For example, a fourth pair (the pair of the second imaging unit 12 at the first image capture position A and the first imaging unit 11 at the second image capture position B) may be used. However, one of the two pairs used for calculating the translation distance $D_{1a}$ must be the same as one of the two pairs used for calculating the translation distance $D_{1b}$.

Figure 16:
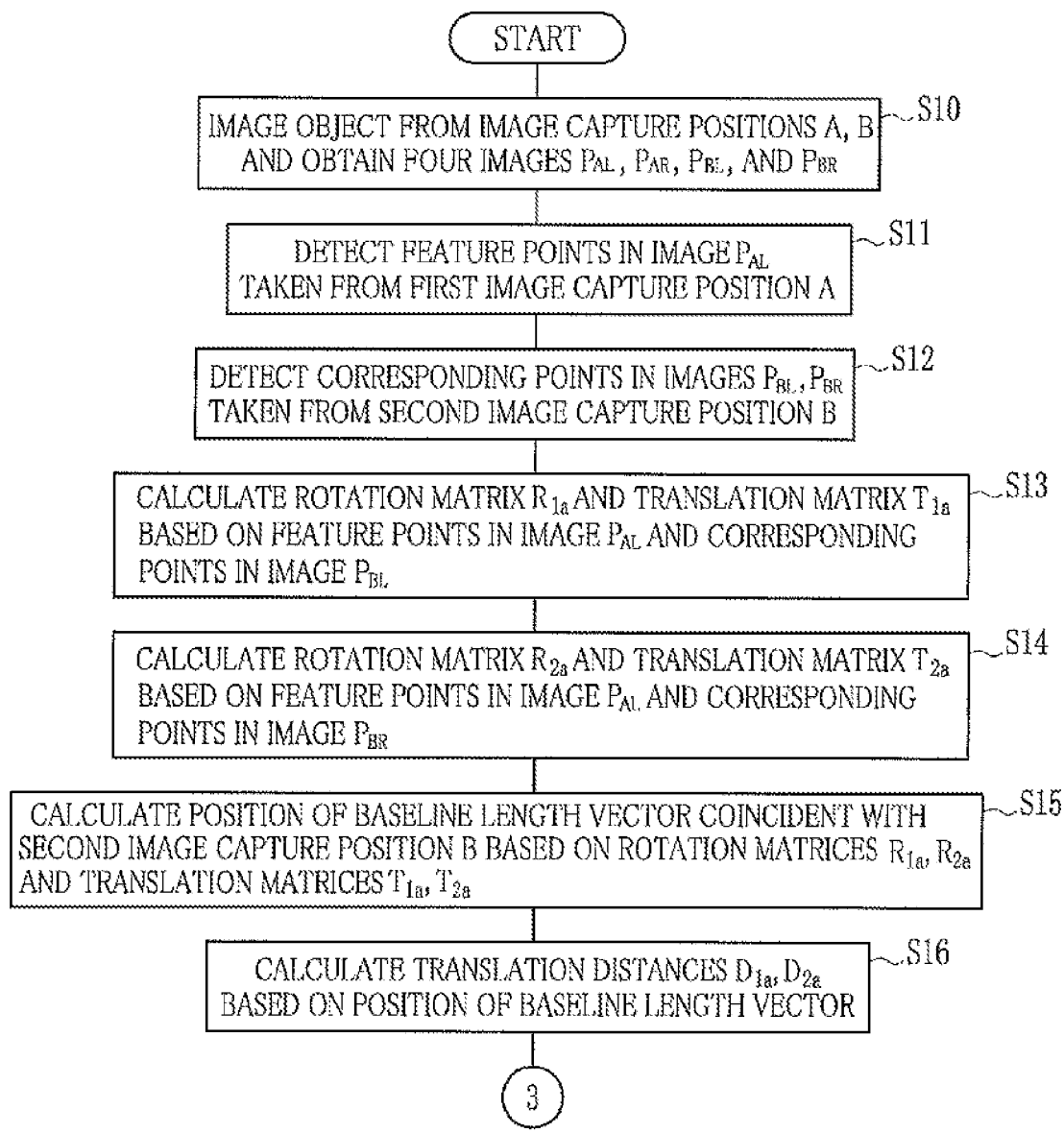
FIG. 16 is a flowchart illustrating a procedure of the three-dimensional measurement according to a modified example of the third embodiment.
Figure 17:
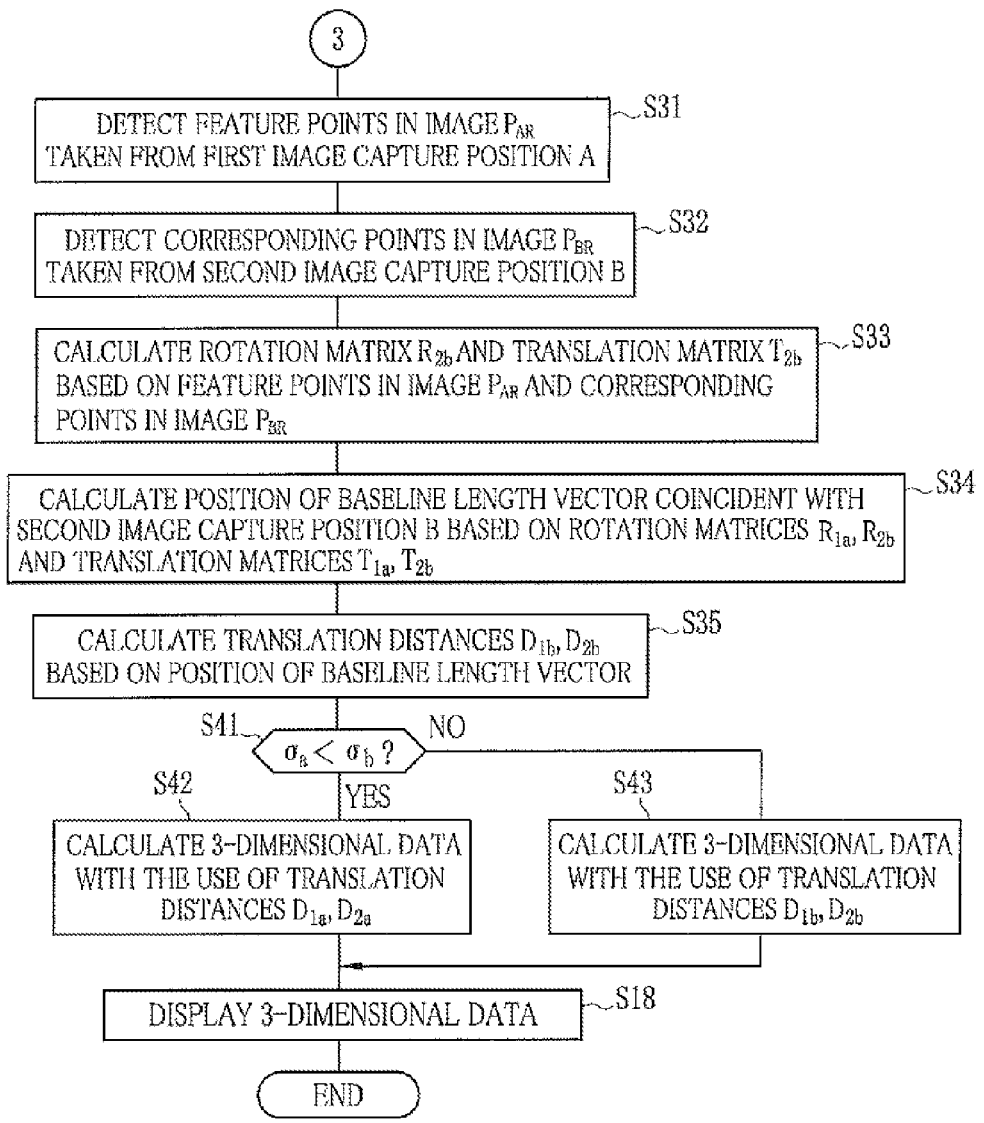
FIG. 17 is a flowchart illustrating a procedure of the three-dimensional measurement according to a modified example of the third embodiment.

Note that, in the third embodiment, the translation distances $D_{1a}$ and $D_{1b}$ are calculated by the two respective types of calculations. In the case where the difference between the translation distances $D_{1a}$ and $D_{1b}$ is large, the corresponding points are redetected. Alternatively, as illustrated in FIGS. 16 and 17, the minimum value $\sigma_a$, which is the minimum value of the distance between the terminal point 32b of the baseline length vector 32 and the direction (line) $T_{2a}$, may be compared with the minimum value $\sigma_b$, which is the minimum value of the distance between terminal point 32b of the baseline length vector 32 and the direction (line) $T_{2b}$ (S41). This is because the minimum values $\sigma_a$ and $\sigma_b$ are used in determining the translation distances $D_{1a}$ and $D_{1b}$. For example, in the case where the minimum value $\sigma_a$ is less than the minimum value $\sigma_b$ ($\sigma_a<\sigma_b$), the translation distance $D_{1a}$ with the error smaller than that of the translation distance $D_{1b}$ is determined to be reliable. The three-dimensional data is calculated based on the translation distance $D_{1a}$ (S42). In the case where the minimum value $\sigma_a$ is greater than or equal to the minimum value $\sigma_b$ ($\sigma_a\geq\sigma_b$), the translation distance $D_{1b}$ with the error smaller than that of the translation distance $D_{1a}$ is determined to be reliable. The three-dimensional data is calculated based on the translation distance $D_{1b}$ (S43). Thus, the three-dimensional data is calculated faster than the case where the corresponding points or the like are redetected and a large error in calculating the three-dimensional data is prevented.

In the above-described modified example, the two types of the pairs of the imaging units are used for calculating the rotation matrices and the translation matrices. Alternatively, the translation distances $D_{1a}$ and $D_{1b}$ may be calculated in two different conditions (or settings). The two conditions may differ from each other in the combination of the feature points or the condition for detecting the corresponding points. The minimum values $\sigma_a$ and $\sigma_b$ obtained at the time of calculating the translation distances $D_{1a}$ and $D_{1b}$ may be compared with each other.

Note that, in the second and third embodiments, the corresponding points and/or the feature points are redetected and the three-dimensional data is recalculated in the same manner or method in the case where the calculation accuracy of the three-dimensional data is determined to be low. Instead, the three-dimensional data may be recalculated in a different method that is totally different from those described in the first to third embodiments. It is preferred to recalculate the three-dimensional data in the different method in the case where the calculation accuracy of the three-dimensional data did not improve even after the redetection of the corresponding points and/or feature points.

Figure 18:
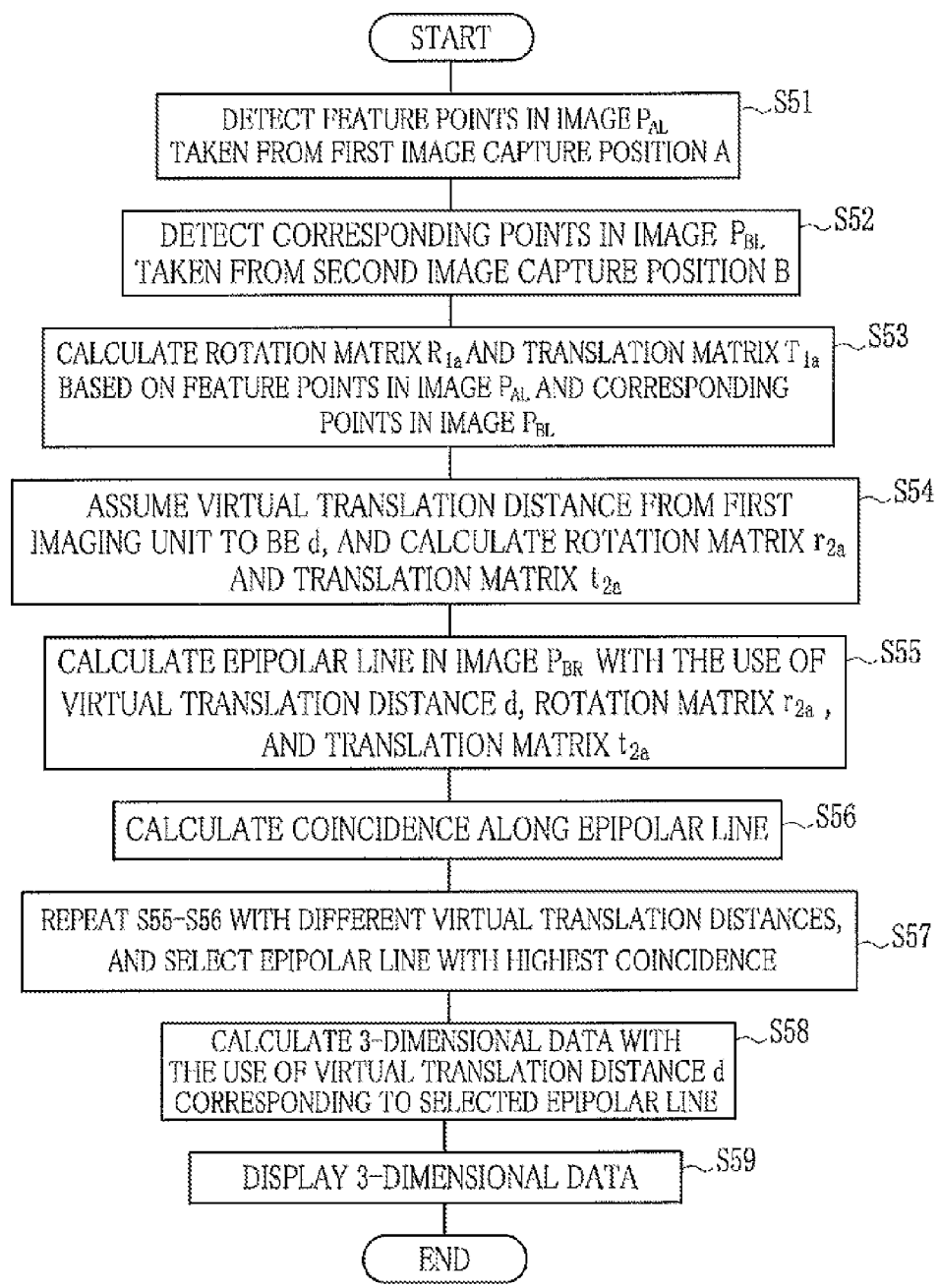
FIG. 18 is a flowchart illustrating another procedure of the three-dimensional measurement.

The different method is illustrated in FIG. 18 by way of example. First, the feature points are detected in the image $P_{AL}$ taken from the first image capture position A with the first imaging unit 11 (S51). The corresponding points, which correspond to the feature points, are detected in the image $P_{BL}$ taken from the second image capture position B with the first imaging unit 11 (S52). The rotation matrix $R_{1a}$ and the translation matrix $T_{1a}$ are calculated based on the feature points and the corresponding points detected (S53). The feature point detection (S51), the corresponding point detection (S52), and the calculation of the rotation matrix and the translation matrix (S53) may be omitted. S51 and S52 may be performed with different detection conditions, and then the rotation matrix $R_{1a}$ and the translation matrix $T_{1a}$ may be calculated in S53.

Figure 19:
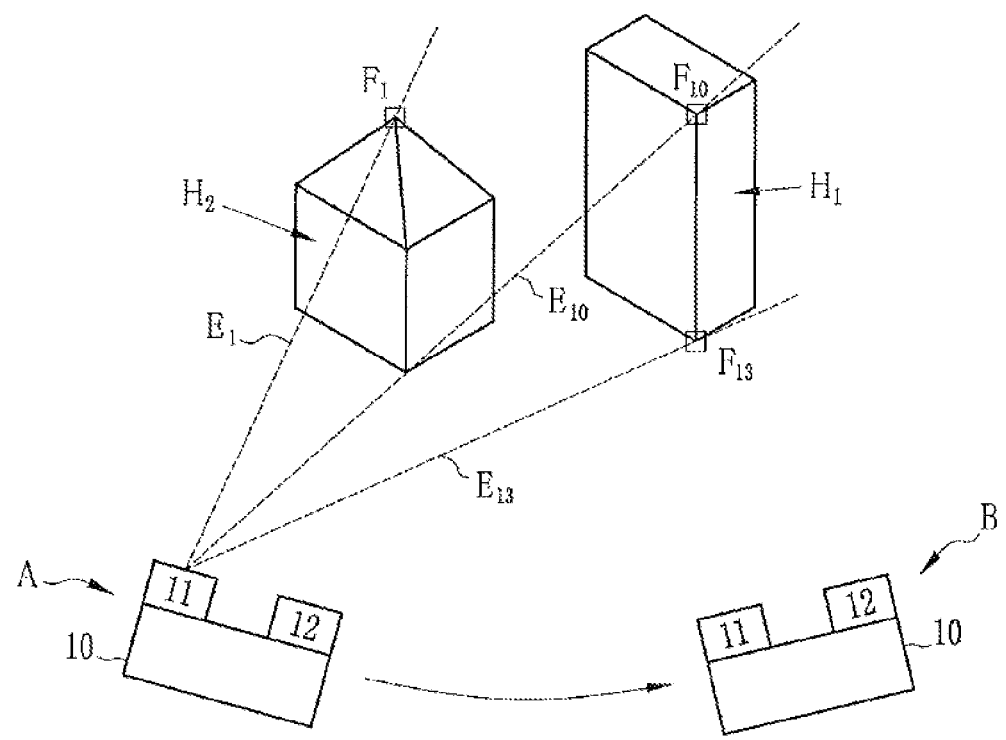
FIG. 19 is an explanatory view illustrating an example of an epipolar line.

Next, suppose the translation distance is an arbitrarily assumed value "d". A rotation matrix $r_1$ and a translation matrix $t_2$ for the second imaging unit 12 at the second image capture position B relative to the first imaging unit 11 at the first image capture position A are calculated based on the assumed value d (hereinafter referred to as the virtual translation distance d), the rotation matrix $R_{1a}$, and the translation matrix $T_{1a}$ (S54). Furthermore, an epipolar line on the image $P_{BR}$ is calculated based on the rotation matrix $r_1$, the translation matrix $t_2$, and the virtual translation distance "d" (S55). The epipolar line represents a line of sight from the first imaging unit 11 at the first image capture position A to the given feature point. As illustrated in FIG. 19, the epipolar line is drawn for each feature point. For example, the epipolar lines $E_1$, $F_{10}$, and $E_{13}$ pass through the feature point $F_1$, $F_{10}$, and $F_{13}$ respectively. The epipolar line on the image $P_{BR}$ refers to a straight line (epipolar line) extending on the image $P_{BR}$.

Then, the coincidence with the given feature point is calculated along the epipolar line (S56). The calculation of the epipolar line (S55) and the calculation of the coincidence (S56) are repeated while the virtual translation distances "d" is changed. Thereby the epipolar line with the highest coincidence with the feature point is selected (S57).

Figure 20:
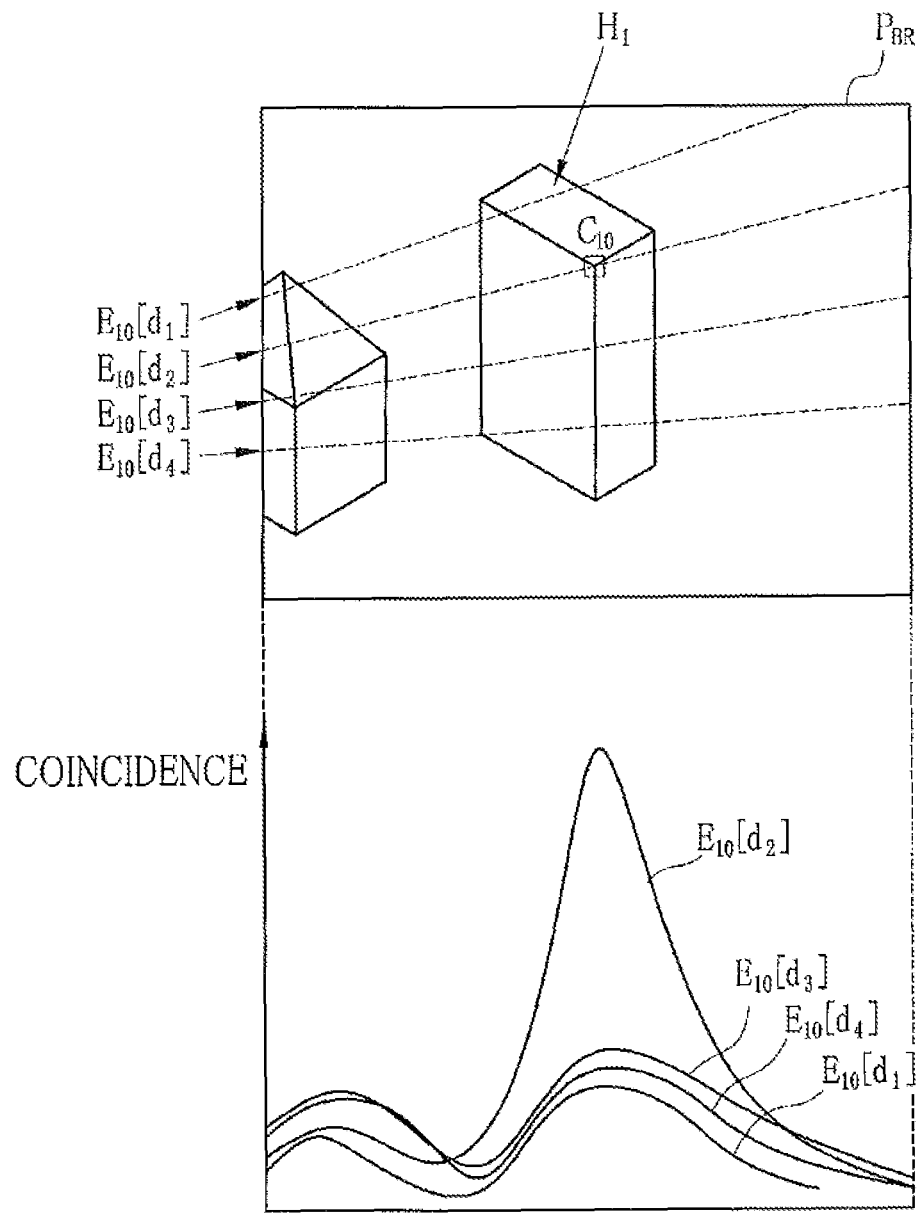
FIG. 20 is an explanatory view illustrating how the coincidence is calculated along epipolar lines.

To be more specific, as illustrated in FIG. 20, in a case where the epipolar lines $E_{10}$, which correspond to the feature point $F_{10}$, are calculated while the virtual translation distance "d" is changed from $d_1$ to $d_4$, an epipolar line $E_{10}[d_1]$ corresponding to the virtual translation distance $d_1$, an epipolar line $E_{10}[d_2]$ corresponding to the virtual translation distance $d_2$, an epipolar line $E_{10}[d_3]$ corresponding to the virtual translation distance $d_3$, and epipolar line $E_{10}[d_4]$ corresponding to the virtual translation distance $d_4$ differ from each other. The true epipolar line is supposed to be passing through the feature point, but since the translation distance used for calculating the epipolar line is the assumed value, the epipolar line extends through a position away from the corresponding point $C_{10}$ on the image $P_{BR}$ when the virtual translation distance "d" differs from the true translation distance "d". In a case where the partial image 31, which contains the feature point $E_{10}$, is compared with portions of the image $P_{BR}$ along each of the epipolar lines $E_{10}[d_1]$ to $E_{10}[d_4]$, a portion (a point) at which the coincidence with the partial image 31 is the highest is found on the epipolar line $E_{10}[d_2]$ passing through the corresponding point $C_{10}$ that corresponds to the feature point $E_{10}$. As described before, the epipolar line is supposed to be passing through the feature point, so that the epipolar line $E_{10}[d_2]$ with the point with the highest coincidence is assumed to be the true epipolar line corresponding to the correct virtual translation distance "d". In FIG. 20, note that the corresponding point $C_{10}$ is depicted for the sake of description, but it is unnecessary to detect the corresponding point $C_{10}$. The calculation of the coincidence corresponds to the detection of the corresponding point $C_{10}$.

The epipolar line $E_{10}[d_2]$ with the highest coincidence is thus selected, allowing assuming that the virtual translation distance $d_2$ used for calculating the epipolar line $E_{10}[d_2]$ is the true translation distance. The three-dimensional data is calculated by using the virtual translation distance $d_2$ (S57).

Figure 21:
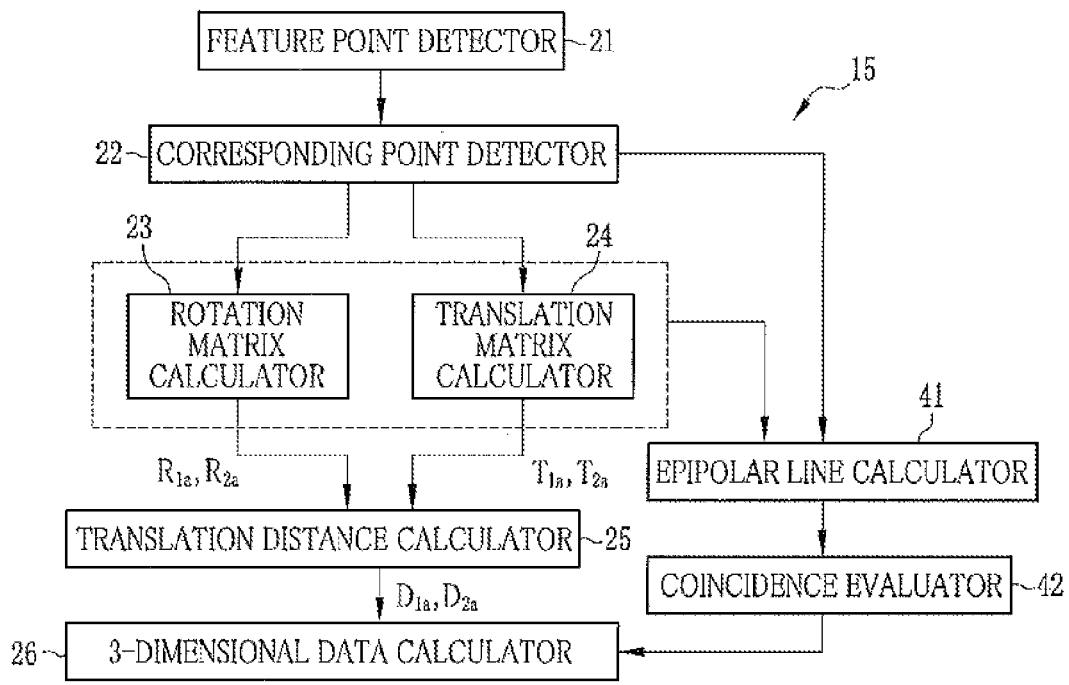
FIG. 21 is a block diagram illustrating configuration of the measurement unit in a case where the three-dimensional measurement is performed with the use of the epipolar line.

Note that, as illustrated in FIG. 21, the measurement unit 15 needs to comprise an epipolar line calculator 41 and a coincidence evaluator 42 to calculate the translation distance with the use of the epipolar lines in the above-described manner. The epipolar line calculator 41 calculates the epipolar lines with the use of the virtual translation distance "d", the rotation matrix $r_{2a}$, and the translation matrix $t_{2a}$ (S55). The coincidence evaluator 42 calculates the coincidence along each of the epipolar lines, which are calculated by the epipolar line calculator 41, and selects one of the epipolar lines with the highest coincidence (S56 and S57). The calculations of the rotation matrix $r_{2a}$ and the translation matrix $t_{2a}$ (S54), with the use of the virtual translation distance "d", are performed by the rotation matrix calculator 23 and the translation matrix calculator 24, respectively.

Figure 22:
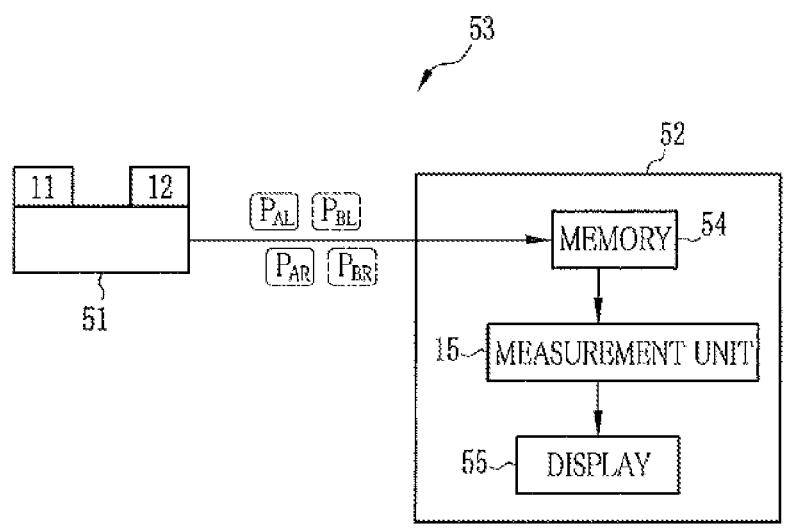
FIG. 22 is a block diagram illustrating a three-dimensional measurement system.

Note that, in the first to third embodiments, the three-dimensional measurement apparatus 10 comprises the first imaging unit 11 and the second imaging unit 12 and incorporates the measurement unit 15. The first imaging unit 11, the second imaging unit 12, and the measurement unit 15 may be separated from each other. As illustrated in FIG. 22, a three-dimensional measurement system 53 is composed of a stereo camera 51 and an image processing device 52. The stereo camera 51 comprises the first imaging unit 11 and the second imaging unit 12. The image processing device 52 comprises the measurement unit 15. The stereo camera 51 may have any configuration as long as the stereo camera 51 has two imaging units (the first imaging unit 11 and the second imaging unit 12) with the known baseline length BL. The image processing device 52 is, for example, a computer in which CPU and various processing circuits constitute the measurement unit 15. In addition to the measurement unit 15, the image processing device 52 comprises, for example, an interface for receiving the images $P_{AL}$, $P_{AR}$, $P_{BL}$, and $P_{BR}$ from the stereo camera 51, a memory 54 for at least temporarily storing these images, and a display 55 for displaying the three-dimensional data calculated by the measurement unit 15.

Figure 23:
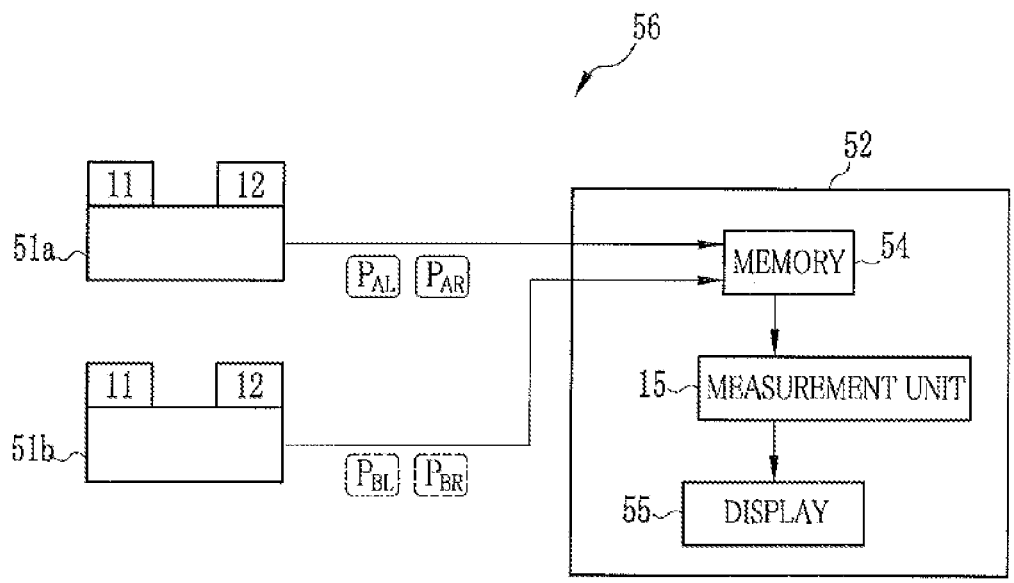
FIG. 23 is a block diagram illustrating a three-dimensional measurement system having stereo cameras.

In the case where the three-dimensional measurement system is composed of the stereo camera and the image processing device separately from each other as described above, a three-dimensional measurement system 56 may be composed of two stereo cameras 51a and 51b and the image processing device 52 as illustrated in FIG. 23. The stereo camera 51a may be used to take the object from the first image capture position A. The stereo camera 51b may be used to take the object from the second image capture position B. The image processing device 52 is capable of calculating the three-dimensional data based on the images taken from the two image capture positions A and B with the individual stereo cameras 51a and 51b. It is preferred that the stereo cameras 51a and 51b are of the same model. The stereo cameras 51a and 51b of different models may be used as long as they have the same the baseline length BL or the baseline length BL of one of the stereo cameras 51a and 51b is adjustable to the baseline length BL of the other. The three-dimensional measurement system may comprise three or more stereo cameras. In this case, the three-dimensional data is calculated by selectively using the images taken from two image capture positions out of the images taken from three image capture positions.

Figure 24:
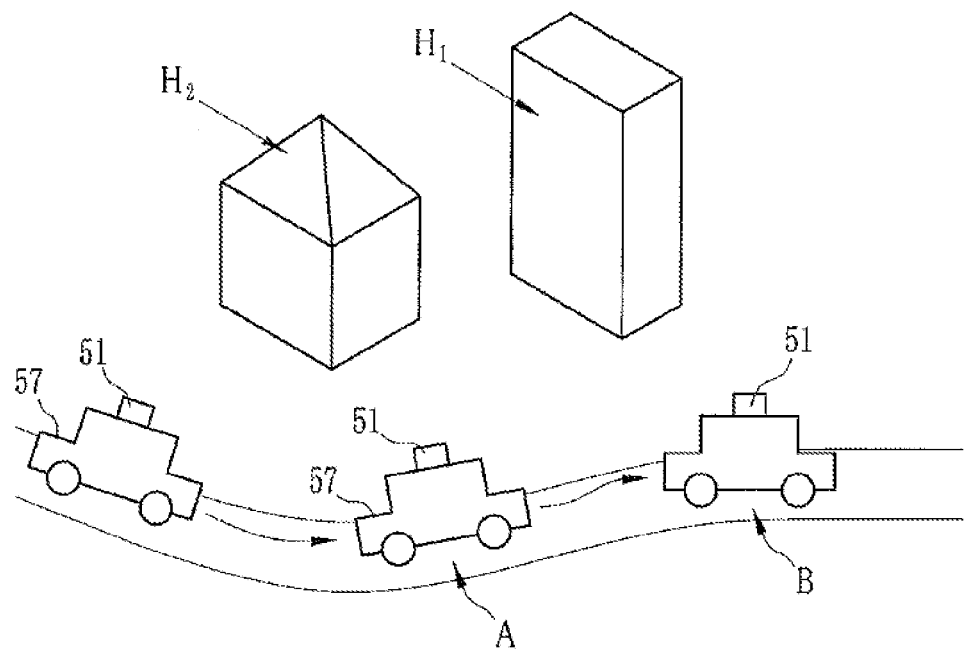
FIG. 24 is an explanatory view illustrating an example in which a vehicle-mounted camera is used as the stereo camera.

For the three-dimensional measurement apparatus 10 comprising the stereo camera 51 and the image processing device 52 separately, a vehicle-mounted camera may be used as the stereo camera 51 as illustrated in FIG. 24. In this case, images are taken while a car 57 moves around the objects $H_1$ and $H_2$. Then the taken images are transmitted to the image processing device 52, and the three-dimensional data of the objects $H_1$ and $H_2$ is calculated. By adopting the vehicle-mounted camera as the stereo camera 51, the three-dimensional data of the object is calculated easily and accurately, taking advantage of moving speed of the car 57. Unlike the huge stereo camera described in the Japanese Patent Laid-Open Publication No. 2007-263669, the compact stereo camera 51 with the known baseline length BL is used as the vehicle-mounted stereo camera 51. Furthermore, there is no need to precisely measure or calibrate the arrangement and the orientation of the stereo camera 51. The stereo camera 51 is just mounted on the car 57 in a way that the stereo camera 51 can take images of the objects $H_1$ and $H_2$. In the case where the object is out of the overlapping imaging fields of the first and second imaging units 11 and 12 due to a direction of the car 57 or the like, the position and the orientation of the stereo camera 51 is adjusted as necessary. The size of the car 57 and the direction of the road have no effect on imaging. There is no difficulty in adjusting the orientation of the stereo camera. It is also possible to mount the entire three-dimensional measurement apparatus 10 including the measurement unit 15 on the car 57.

Note that, in the first to third embodiments, the baseline length BL of the three-dimensional measurement apparatus 10 is invariable. Alternatively, the baseline length may be changeable. In this case, however, all the images used for calculating the three-dimensional data must be taken with the same baseline length. The changed baseline length BL needs to be a known value in at least calculating the three-dimensional data. To maintain the accuracy of measuring the three-dimensional data, the changed baseline length BL needs to be measured precisely enough to calculate the three-dimensional data.

Note that, in the first to third embodiments, the second image capture position B is determined by placing the initial point 32a of the baseline length vector 32 on the direction (line) $T_{1a}$ and calculating the distance between the terminal point 32b and the direction (line) $T_{2a}$. Alternatively, the second image capture position B may be determined by placing the initial point 32a on the direction $T_{2a}$ and calculating the distance between the terminal point 32b and the direction $T_{1a}$. The initial point 32a and the terminal point 32b of the baseline length vector 32 may be defined reversely.

Note that, in the first to third embodiments, the imaging optical axes $L_1$ and $L_2$ of the first and second imaging units 11 and 12 are parallel. Alternatively, the first imaging unit 11 and the second imaging unit 12 may be tilted relative to each other such that the imaging optical axes $L_1$ and $L_2$ are not parallel. In this case, the calculation of the three-dimensional data becomes complicated. However, the basic principles are the same as those in the first to third embodiments. To be more specific, in determining the second image capture position B, the baseline length vector 32 is enlarged or reduced as appropriate in accordance with the position of the initial point and the angle between the imaging optical axes $L_1$ and $L_2$ in the case where the baseline length vector 32 is moved along the direction (line) $T_{1a}$.

Note that, in the above embodiments, the first imaging unit 11 and the second imaging unit 12 take the images simultaneously. However, the imaging timing of the first and second imaging units 11 and 12 may not necessarily be exactly the same. The first and second imaging units 11 and 12 may perform imaging sequentially, for example, in this order, as long as the first and second imaging units 11 and 12 perform the imaging at roughly the same time with the image capture positions and the inclination of the three-dimensional measurement apparatus 10 remaining constant or slightly moved within a negligible range.

Various changes and modifications are possible in the present invention and may be understood to be within the present invention.

What is claimed is:

1. A three-dimensional measurement apparatus comprising:
    a first imaging unit for imaging an object;
    a second imaging unit disposed at a distance of a predetermined baseline length from the first imaging unit, the second imaging unit imaging at least a part of the object imaged with the first imaging unit;
    a feature point detector for detecting a plurality of feature points in at least one of two images of the object taken from a first image capture position with the first and second imaging units;
    a corresponding point detector for detecting corresponding points in each of two images of the object taken from a second image capture position with the first and second imaging units, the second image capture position being different from the first image capture position, the corresponding points corresponding to the feature points;
    a rotation matrix calculator for calculating a first rotation matrix and a second rotation matrix based on the feature points and the corresponding points, the first rotation matrix representing direction and amount of rotation of the first imaging unit at the second image capture position relative to a direction of the first imaging unit or the second imaging unit at the first image capture position, the second rotation matrix representing direction and amount of rotation of the second imaging unit at the second image capture position relative to the direction of the first imaging unit or the second imaging unit at the first image capture position;
    a translation matrix calculator for calculating a first translation matrix and a second translation matrix based on the feature points and the corresponding points, the first translation matrix representing a translation direction of the first imaging unit at the second image capture position relative to a position of the first imaging unit or the second imaging unit at the first image capture position, the second translation matrix representing a translation direction of the second imaging unit at the second image capture position relative to the position of the first imaging unit or the second imaging unit at the first image capture position;
    a translation distance calculator for calculating a translation distance of the first imaging unit or the second imaging unit at the second image capture position relative to the first imaging unit or the second imaging unit at the first image capture position, the translation distance calculator calculating the translation distance based on the first rotation matrix, the second rotation matrix, the first translation matrix, the second translation matrix, and the baseline length in a case where at least one of the first rotation matrix and the second rotation matrix is not a zero matrix; and
    a three-dimensional data calculator for calculating three-dimensional data of the object based on the translation distance.

2. The three-dimensional measurement apparatus according to claim 1, wherein the translation distance calculator calculates a position of a baseline length vector at which a distance between a terminal point of the baseline length vector and one of a first direction and a second direction is at a minimum value, and calculates the each translation distance based on a position of an initial point and a position of the terminal point of the baseline length vector located at the calculated position, and
    the baseline length vector has the baseline length, and the initial point of the baseline length vector defined by the first rotation matrix and the second rotation matrix is placed on the other of the first direction and the second direction, and the first direction is represented by the first translation matrix, and the second direction is represented by the second translation matrix.

3. The three-dimensional measurement apparatus according to claim 2, wherein the translation distance calculator compares the minimum value of the distance between the terminal point of the baseline length vector and the one of the first direction and the second direction with a predetermined threshold value and recalculates the translation distance with a changed condition in a case where the minimum value is greater than or equal to the predetermined threshold value.

4. The three-dimensional measurement apparatus according to claim 1, wherein the translation distance calculator recalculates the translation distance with the changed condition in a case where a difference between a first translation distance and a second translation distance is greater than or equal to a predetermined threshold value, and the first translation distance is calculated based on a combination of the images selected arbitrarily from the four images taken from the first image capture position and the second image capture position, and the second translation distance is calculated based on a combination of the images different from the combination of the images used for calculating the first translation distance, and the first translation distance and the second translation distance represent the same distance between the imaging units.

5. The three-dimensional measurement apparatus according to claim 3, wherein, in a case where the translation distance calculator recalculates the translation distance, the corresponding point detector changes a condition for detecting the corresponding points and redetects the corresponding points, and the rotation matrix calculator, the translation matrix calculator, and the translation distance calculator recalculate the rotation matrix, the translation matrix, and the translation distance, respectively, based on the feature points and the redetected corresponding points.

6. The three-dimensional measurement apparatus according to claim 5, wherein the condition changed for redetecting the corresponding points is a combination of the feature points.

7. The three-dimensional measurement apparatus according to claim 5, wherein the corresponding point detector detects the corresponding points with the use of a block matching method in which a partial image, which contains the feature point, of the image which contains the feature points and taken from the first image capture position is compared with each portion of the image taken from the second image capture position and the portion with high coincidence with the partial image is determined to be the corresponding point, and the condition to be changed for redetecting the corresponding points includes any one of a scaling factor and a rotation angle of the partial image used for comparing the partial image with the each portion of the image taken from the second image capture position.

8. The three-dimensional measurement apparatus according to claim 3, wherein the feature point detector changes a condition for detecting the feature points and redetects the feature points, and the corresponding point detector, the rotation matrix calculator, the translation matrix calculator, and the translation distance calculator recalculate detection of the corresponding points, the rotation matrix, the translation matrix, and the translation distance, respectively, based on the redetected feature points.

9. The three-dimensional measurement apparatus according to claim 3, wherein the rotation matrix calculator recalculates the second rotation matrix based on an assumed value, being the translation distance of the first imaging unit, the first rotation matrix, and the first translation matrix, and the translation matrix calculator recalculates the second translation matrix based on the assumed value, the first rotation matrix, and the first translation matrix, and the translation distance calculator calculates an epipolar line determined by the feature point, for at least the one feature point, on the image taken from the second image capture position, based on the assumed value, the recalculated second rotation matrix, and the recalculated second translation matrix, and calculates coincidence with the feature point along the epipolar line, and changes the assumed value and repeats the calculation of the coincidence and selects the epipolar line with the highest coincidence and thereby determines the second image capture position and recalculates the translation distance.

10. The three-dimensional measurement apparatus according to claim 2, wherein the translation distance calculator calculates in advance the translation distances with different conditions which differ in a combination of the feature points, out of the plurality of feature points, used for detecting the corresponding points or a condition for detecting the corresponding points, and the three-dimensional data calculator compares the minimum values of the distances between the terminal point of the baseline length vector and the one of the first and second directions, and uses the translation distance calculated with the condition in which the smaller minimum value is obtained.

11. The three-dimensional measurement apparatus according to claim 1, wherein the three-dimensional data refers to a dimension of the object in real space or three-dimensional model data of the object.

12. An image processing device comprising:

a storage for storing images taken from each of first and second image capture positions with one or two stereo cameras, the stereo camera having a first imaging unit for imaging an object and a second imaging unit disposed at a distance of a predetermined baseline length from the first imaging unit, the second imaging unit imaging at least a part of the object imaged with the first imaging unit;

a feature point detector for detecting a plurality of feature points in at least one of the two images of the object taken from the first image capture position with the first and second imaging units;

a corresponding point detector for detecting corresponding points in each of the two images of the object taken from the second image capture position with the first and second imaging units, the second image capture position being different from the first image capture position, the corresponding points corresponding to the feature points;

a rotation matrix calculator for calculating a first rotation matrix and a second rotation matrix based on the feature points and the corresponding points, the first rotation matrix representing direction and amount of rotation of the first imaging unit at the second image capture position relative to a direction of the first imaging unit or the second imaging unit at the first image capture position, the second rotation matrix representing direction and amount of rotation of the second imaging unit at the second image capture position relative to the direction of the first imaging unit or the second imaging unit at the first image capture position;

a translation matrix calculator for calculating a first translation matrix and a second translation matrix based on the feature points and the corresponding points, the first translation matrix representing a translation direction of the first imaging unit at the second image capture position relative to a position of the first imaging unit or the second imaging unit at the first image capture position, the second translation matrix representing a translation direction of the second imaging unit at the second image capture position relative to the position of the first imaging unit or the second imaging unit at the first image capture position;

a translation distance calculator for calculating a translation distance of the first imaging unit or the second imaging unit at the second image capture position relative to the first imaging unit or the second imaging unit at the first image capture position, the translation distance calculator calculating the translation distance based on the first rotation matrix, the second rotation matrix, the first translation matrix, the second translation matrix, and the baseline length in a case where at least one of the first rotation matrix and the second rotation matrix is not a zero matrix; and a three-dimensional data calculator for calculating three-dimensional data of the object based on the translation distance.

13. A three-dimensional measurement method for measuring three-dimensional data of an object with one or two stereo cameras, the stereo camera having a first imaging unit for imaging the object and a second imaging unit disposed at a distance of a predetermined baseline length from the first imaging unit, the second imaging unit imaging at least a part of the object imaged with the first imaging unit, the three-dimensional measurement method comprising the steps of:

detecting a plurality of feature points in at least one of two images of the object taken from a first image capture position with the first and second imaging units;

detecting corresponding points that correspond to the feature points in each of two images of the object taken from a second image capture position with the stereo camera, the second image capture position being different from the first image capture position;

calculating a first rotation matrix and a second rotation matrix based on the feature points and the corresponding points, the first rotation matrix representing direction and amount of rotation of the first imaging unit at the second image capture position relative to a direction of the first imaging unit or the second imaging unit at the first image capture position, the second rotation matrix representing direction and amount of rotation of the second imaging unit at the second image capture position relative to the direction of the first imaging unit or the second imaging unit at the first image capture position;

calculating a first translation matrix and a second translation matrix based on the feature points and the corresponding points, the first translation matrix representing a translation direction of the first imaging unit at the second image capture position relative to a position of the first imaging unit or the second imaging unit at the first image capture position, the second translation matrix representing a translation direction of the second imaging unit at the second image capture position relative to the position of the first imaging unit or the second imaging unit at the first image capture position;

calculating a translation distance of the first imaging unit or the second imaging unit at the second image capture position relative to the first imaging unit or the second imaging unit at the first image capture position, the translation distance being calculated based on the first rotation matrix, the second rotation matrix, the first translation matrix, the second translation matrix, and the baseline length in a case where at least one of the first rotation matrix and the second rotation matrix is not a zero matrix; and calculating three-dimensional data of the object based on the translation distance.

* * * * *